(12) United States Patent
Barkovic et al.

(10) Patent No.: US 11,611,480 B2
(45) Date of Patent: Mar. 21, 2023

(54) SYSTEMS AND METHODS FOR AUTOMATED GOVERNANCE, RISK, AND COMPLIANCE

(71) Applicant: ServiceNow, Inc., Santa Clara, CA (US)

(72) Inventors: David Barkovic, San Francisco, CA (US); Cresta Kirkwood, San Diego, CA (US); Lal Narayanasamy, Pleasanton, CA (US); Anushree Randad, Milpitas, CA (US); Clifford Huntington, Somerville, MA (US); Richard Reybok, Fremont, CA (US); Harold Byun, Redwood City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 84 days.

(21) Appl. No.: 17/087,196

(22) Filed: Nov. 2, 2020

(65) Prior Publication Data

US 2021/0051067 A1 Feb. 18, 2021

Related U.S. Application Data

(63) Continuation of application No. 15/815,129, filed on Nov. 16, 2017, now Pat. No. 10,826,767.
(Continued)

(51) Int. Cl.
*H04L 12/24* (2006.01)
*H04L 41/0859* (2022.01)
(Continued)

(52) U.S. Cl.
CPC ........ *H04L 41/0859* (2013.01); *G06F 3/0481* (2013.01); *G06F 3/0482* (2013.01); *G06F 3/0486* (2013.01); *G06F 3/04847* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/14* (2013.01); *G06F 11/3006* (2013.01); *G06F 11/3452* (2013.01); *G06F 16/1873* (2019.01); *G06F 16/248* (2019.01); *G06F 16/2423* (2019.01); *G06F 16/2474* (2019.01); *G06F 16/2477* (2019.01); *G06F 16/24578* (2019.01); *G06F 16/27* (2019.01); *G06F 16/30* (2019.01); *G06F 16/904* (2019.01); *G06F 16/951* (2019.01); *G06F 40/18* (2020.01); *G06F 40/186* (2020.01); *G06Q 10/067* (2013.01); *G06Q 10/0635* (2013.01); *G06Q 10/06314* (2013.01); *G06Q 10/06315* (2013.01); *G06Q 10/06393* (2013.01); *G06Q 30/018* (2013.01);
(Continued)

(58) Field of Classification Search
CPC . H04L 41/0859; G06F 3/0482; G06F 11/3452
USPC ........................................................ 726/1
See application file for complete search history.

(56) References Cited

U.S. PATENT DOCUMENTS 6,321,229 B1 11/2001 Goldman
6,678,887 B1 1/2004 Hallman
(Continued)

*Primary Examiner* — Venkat Perungavoor
*Assistant Examiner* — Peiliang Pan
(74) *Attorney, Agent, or Firm* — Fletcher Yoder PC

(57) ABSTRACT

Systems and methods for configuration vulnerability checking and remediation are provided. The systems provided herein identify risk based upon service indications of a particular configuration, such that automated risk analysis may be facilitated.

20 Claims, 19 Drawing Sheets

Related U.S. Application Data

(60) Provisional application No. 62/568,087, filed on Oct. 4, 2017.

(51) Int. Cl.

| | | |
|---|---|---|
| G06F 9/50 | (2006.01) | |
| G06F 9/48 | (2006.01) | |
| G06F 9/46 | (2006.01) | |
| H04L 9/40 | (2022.01) | |
| G06F 11/14 | (2006.01) | |
| G06F 40/18 | (2020.01) | |
| G06F 40/186 | (2020.01) | |
| G06F 16/18 | (2019.01) | |
| G06F 16/2458 | (2019.01) | |
| H04L 41/5006 | (2022.01) | |
| H04L 67/55 | (2022.01) | |
| H04L 67/60 | (2022.01) | |
| G06F 16/951 | (2019.01) | |
| G06F 9/54 | (2006.01) | |
| G06F 9/451 | (2018.01) | |
| G06F 16/27 | (2019.01) | |
| G06F 16/2457 | (2019.01) | |
| G06F 16/242 | (2019.01) | |
| G06F 16/248 | (2019.01) | |
| G06F 11/30 | (2006.01) | |
| G06F 11/34 | (2006.01) | |
| G06F 3/0486 | (2013.01) | |
| G06Q 10/0631 | (2023.01) | |
| G06Q 30/0601 | (2023.01) | |
| H04L 41/084 | (2022.01) | |
| H04L 41/12 | (2022.01) | |
| H04L 41/22 | (2022.01) | |
| H04L 43/045 | (2022.01) | |
| H04L 43/08 | (2022.01) | |
| G06F 3/04847 | (2022.01) | |
| G06Q 30/018 | (2023.01) | |
| G06Q 50/18 | (2012.01) | |
| G06F 16/904 | (2019.01) | |
| G06F 3/0482 | (2013.01) | |
| G06Q 10/0639 | (2023.01) | |
| G06Q 40/12 | (2023.01) | |
| G06F 16/30 | (2019.01) | |
| G06Q 10/067 | (2023.01) | |
| G06F 3/0481 | (2022.01) | |
| G06Q 10/0635 | (2023.01) | |
| H04L 41/0803 | (2022.01) | |
| H04L 41/0893 | (2022.01) | |
| H04L 43/50 | (2022.01) | |
| G06F 9/445 | (2018.01) | |
| G06F 21/53 | (2013.01) | |
| H04L 41/5009 | (2022.01) | |
| G06F 3/0484 | (2022.01) | |
| H04L 41/08 | (2022.01) | |
| H04L 67/00 | (2022.01) | |
| H04L 67/12 | (2022.01) | |
| G06F 21/57 | (2013.01) | |

(52) U.S. Cl.
CPC ..... *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 41/5006* (2013.01); *H04L 43/045* (2013.01); *H04L 43/08* (2013.01); *H04L 43/50* (2013.01); *H04L 63/10* (2013.01); *H04L 63/1433* (2013.01); *H04L 63/20* (2013.01); *H04L 67/55* (2022.05); *H04L 67/60* (2022.05); *G06F 3/0484* (2013.01); *G06F 9/44505* (2013.01); *G06F 21/53* (2013.01); *G06F 21/577* (2013.01); *H04L 41/0879* (2013.01); *H04L 41/5016* (2013.01); *H04L 67/12* (2013.01); *H04L 67/34* (2013.01)

(56) References Cited

U.S. PATENT DOCUMENTS

| | | | |
|---|---|---|---|
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,392,300 | B2 | 6/2008 | Anantharangachar |
| 7,617,073 | B2 | 11/2009 | Trinon |
| 7,685,167 | B2 | 3/2010 | Mueller |
| 7,716,353 | B2 | 5/2010 | Golovinsky |
| 7,769,718 | B2 | 8/2010 | Murley |
| 7,925,981 | B2 | 4/2011 | Pourheidar |
| 7,933,927 | B2 | 4/2011 | Dee |
| 7,945,860 | B2 | 5/2011 | Vambenepe |
| 8,082,222 | B2 | 12/2011 | Rangarajan |
| 8,121,874 | B1 | 2/2012 | Guheen |
| 8,151,261 | B2 | 4/2012 | Sirota |
| 8,207,316 | B1 | 6/2012 | Bentwich |
| 8,380,645 | B2 | 2/2013 | Kowalski |
| 8,402,127 | B2 | 3/2013 | Solin |
| 8,554,750 | B2 | 10/2013 | Rangaranjan |
| 8,646,093 | B2 | 2/2014 | Myers |
| 8,745,040 | B2 | 6/2014 | Kowalski |
| RE45,009 | E | 7/2014 | Vange |
| 8,812,539 | B2 | 8/2014 | Milousheff |
| 8,818,944 | B2 | 8/2014 | Kowalski |
| 8,832,652 | B2 | 9/2014 | Mueller |
| 9,015,188 | B2 | 4/2015 | Behne |
| 9,037,115 | B2 | 5/2015 | Vos |
| 9,065,783 | B2 | 6/2015 | Ding |
| 9,098,322 | B2 | 8/2015 | Apte |
| 9,122,552 | B2 | 9/2015 | Whitney |
| 9,137,115 | B2 | 9/2015 | Mayfield |
| 9,317,237 | B2 | 4/2016 | Apte |
| 9,323,801 | B2 | 4/2016 | Morozov |
| 9,363,252 | B2 | 6/2016 | Mueller |
| 9,432,298 | B1 | 8/2016 | Smith |
| 9,412,084 | B2 | 9/2016 | Kowalski |
| 9,467,344 | B2 | 10/2016 | Gere |
| 9,535,737 | B2 | 1/2017 | Joy |
| 9,557,969 | B2 | 1/2017 | Sharma |
| 9,613,070 | B2 | 4/2017 | Kumar |
| 9,645,833 | B2 | 5/2017 | Mueller |
| 9,654,473 | B2 | 5/2017 | Miller |
| 9,659,051 | B2 | 5/2017 | Hutchins |
| 9,766,935 | B2 | 9/2017 | Kelkar |
| 9,792,387 | B2 | 10/2017 | George |
| 9,805,322 | B2 | 10/2017 | Kelkar |
| 9,852,165 | B2 | 12/2017 | Morozov |
| 10,002,203 | B2 | 6/2018 | George |
| 2007/0036314 | A1* | 2/2007 | Kloberdans ......... H04L 65/1079 379/189 |
| 2007/0143851 | A1 | 6/2007 | Nicodemus |
| 2009/0113434 | A1 | 4/2009 | Podila |
| 2010/0011116 | A1 | 1/2010 | Thornton |
| 2010/0023528 | A1 | 1/2010 | Cion |
| 2010/0250497 | A1 | 9/2010 | Redlich |
| 2011/0219208 | A1 | 9/2011 | Asaad |
| 2012/0053981 | A1* | 3/2012 | Lipps ................. G06Q 10/0635 705/7.28 |
| 2012/0102543 | A1* | 4/2012 | Kohli ..................... H04L 63/20 726/1 |
| 2012/0137367 | A1 | 5/2012 | Dupont |
| 2013/0096980 | A1 | 4/2013 | Basavapatna |

(56) References Cited

U.S. PATENT DOCUMENTS

| | | | |
|---|---|---|---|
| 2013/0247205 A1* | 9/2013 | Schrecker | G06F 21/577 726/25 |
| 2014/0257917 A1* | 9/2014 | Spencer | G06Q 10/0635 705/7.28 |
| 2016/0042304 A1* | 2/2016 | Maloney | G06Q 10/0635 705/7.28 |
| 2016/0080420 A1 | 3/2016 | Ray | |
| 2016/0147522 A1 | 5/2016 | Dimitrakos | |
| 2016/0187333 A1 | 6/2016 | Moll | |
| 2016/0224911 A1* | 8/2016 | Rush | G06Q 10/0635 |
| 2017/0006135 A1 | 1/2017 | Siebel | |
| 2017/0070058 A1 | 3/2017 | Corum | |
| 2017/0364849 A1* | 12/2017 | Glotz | G06Q 40/025 |
| 2018/0034856 A1 | 2/2018 | Mallya | |
| 2018/0069865 A1 | 3/2018 | Rieke | |
| 2019/0104156 A1 | 4/2019 | Barkovic | |
| 2019/0228777 A1 | 7/2019 | Papadimitriou | |
| 2019/0265971 A1 | 8/2019 | Behzadi | |
| 2020/0003761 A1 | 1/2020 | Studer | |

* cited by examiner

SYSTEMS AND METHODS FOR AUTOMATED GOVERNANCE, RISK, AND COMPLIANCE

CROSS-REFERENCE TO RELATED APPLICATION(S)

This application is a continuation of U.S. patent application Ser. No. 15/815,129, filed on Nov. 16, 2017, entitled, "SYSTEMS AND METHODS FOR AUTOMATED GOVERNANCE, RISK, AND COMPLIANCE," which claims the benefit of U.S. Provisional Application No. 62/568,087, filed Oct. 4, 2017. The entire contents of these applications are hereby incorporated by reference in their entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications).

As networked computer systems become increasingly advanced, these systems may incorporate more and more computer resources, the computer resources increasing a number of variables in the computer systems. These variables may introduce certain vulnerabilities to the system, which may provide avenues for security breach or other undesirable events within the computer system. For example, vulnerabilities may be introduced via software issues (e.g., flaws in software code) and/or at a deployment stage of software (e.g., flaws in configuration of software).

Accordingly, while the capabilities of networked computer systems have increased by incorporating vast arrangement of networked computer systems performing specialized functionality, this growth in complexity has resulted in added complexities in proactively preventing malicious attacks or other undesirable events via introduced system vulnerabilities.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing numbers of different computing devices are incorporated into vast networked computing systems, it becomes increasingly difficult to proactively root out system vulnerabilities. The current embodiments facilitate Secure Configuration Assessment (SCA) across a networked environment. For instance, the current embodiments enable enhanced vulnerability management for vulnerabilities in configuration of software. More specifically, the current embodiments provide tools for generating vulnerability avoidance policies and monitoring tools, which may provide policy compliance reports across the network landscape.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 8 is an illustration of a GUI rending of the Control Results tab of the GUI of FIG. 7, in accordance with an embodiment;

FIG. 9 is an illustration of a GUI of FIG. 8 after a non-compliant filter is applied to the Test Results, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following discussion relates to analysis, forecasting, and reporting systems for Information Technology (IT) systems. However, this is not meant to limit the current techniques to IT systems. Indeed, the current techniques may be useful in a number of different contexts. For example the current techniques may be applied to Human Resources (HR) systems or any system that may benefit from the analysis, forecasting, and reporting of data.

Keeping this in mind, the discussion now turns to an Information Technology (IT)-centered example. IT devices are increasingly important in an electronics-driven world in which various electronics devices are interconnected within a distributed context. As more functions are performed by services using some form of distributed computing, the complexity of IT network management increases. As management complexities increase, data analysis, forecasting, and reporting may become more complex.

Figure 1:
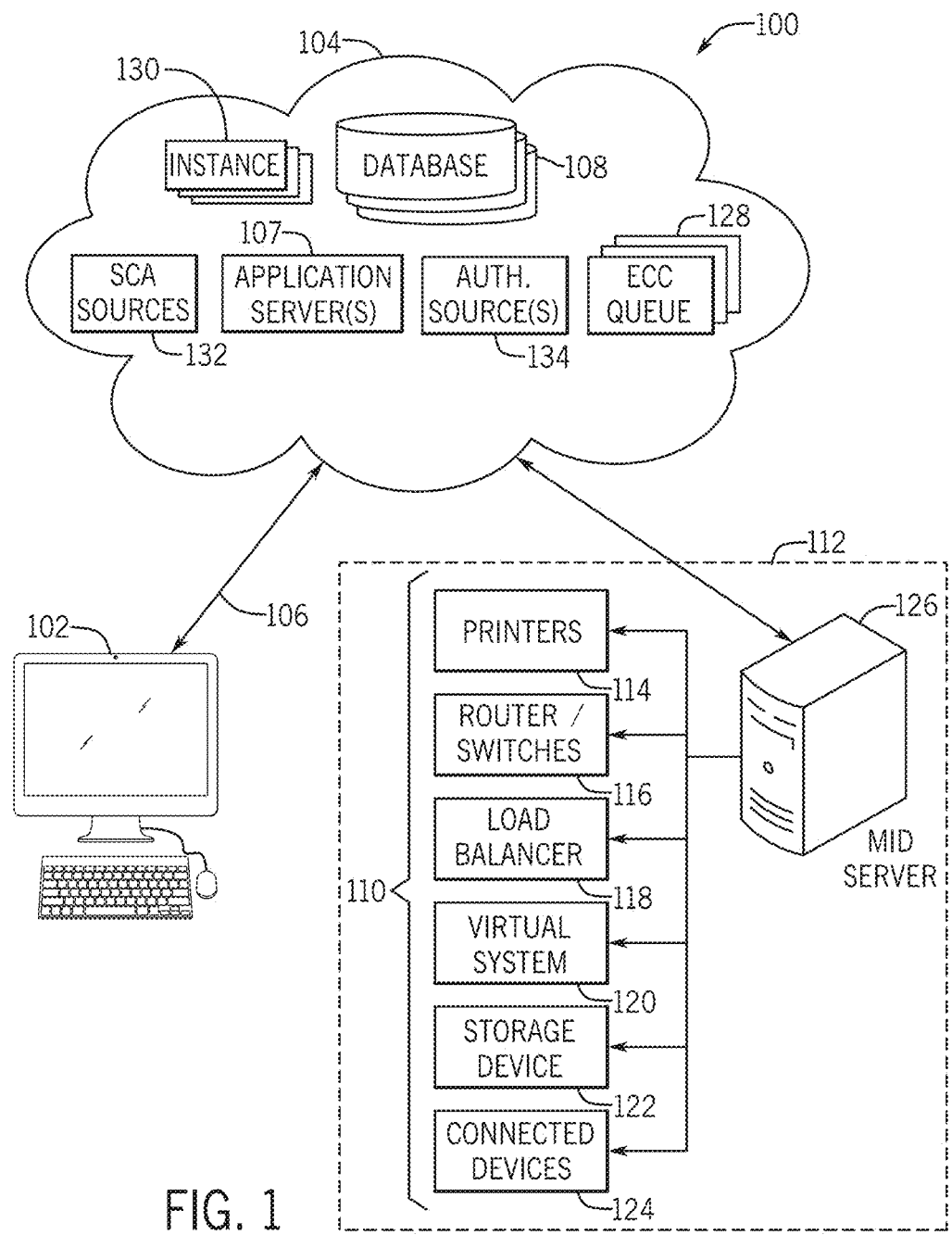
FIG. 1 is a block diagram of a generalized distributed computing system utilizing a cloud service type platform and databases, in accordance with an embodiment.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally, or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, here a cloud service type platform, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally, or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related to various IT assets that may be present within the network 112. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and/or a time series database. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via an External Communications Channel Queue 128. The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104. As discussed below, the MID server 126 may periodically or intermittently use discovery probes to determine information on devices connected to the network 112 and return the probe results back to the platform 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication channel 128 may be a database table that is typically queried, updated, and inserted into by other systems. Each record in the communication channel queue 128 is a message from an instance in the platform 104 to a system (e.g., MID server 126) external to the platform 104 that connects to the platform 104 or a specific instance 130 running in the platform 104 or a message to the instance from the external system. The fields of a communication channel queue 128 record include various data about the external system or the message in the record.

Although the system 100 is described as having the application servers 107, the databases 108, the communication channel queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, other methods for populating the databases 108 may include directly importing the CIs or other entries from an external source, manual import by users entering CIs or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Further, to facilitate the techniques described herein, the platform 104 may include data from additional sources. For example, as illustrated, one or more Secure Configuration Assessment (SCA) source integrations 132 may provide information related to configuration assessment of the CIs 110. For example, the SCA sources 132 may provide scanning services that scan the CIs 110 for configuration data/settings. The configuration data/settings may be used to assess vulnerabilities of the CIs 110 and/or may provide an indication of suggested remedial measures to decrease these vulnerabilities. Data may be retrieved from the SCA source integrations 132 via one or more application programming interfaces (APIs). The SCA source integrations 132 may provide data in a number of formats. The data from multiple SCA source integrations 132 may be normalized and merged into merged SCA data. For example, the SCA source integrations 132 may scan the CIs 110 for configuration information, such as password requirements (e.g., age, complexity, etc.) and provide an indication of these settings to the platform 104.

Additionally, authoritative source provider integrations 134 may provide electronic records indicative of certain configuration compliance requirements/recommendations. Certain authoritative entities may release configuration recommendations for CI 110 security, which may be transposed into an electronic format, which is received by the platform 104. For example, one authoritative source, the National Institute of Standards and Technology (NIST), is an organization that creates and promotes standards to be used by federal agencies to implement the Federal Information Security Management ACT (FISMA). NIST also manages other programs designed to protect information and promote information security. NIST has provided the NIST 800-53 publication, which provides recommendations for security controls for federal information systems and organization. For example, returning to the password criteria discussed above, the NIST 800-53 publication may provide an indication of suggested password complexity and/or age requirements.

NIST and NIST 800-53 are just one example of an authoritative source and its security recommendations. Many other authoritative sources and their security recommendations are also available for integration into the platform 104. The authoritative source integrations 134 may receive an electronic indication of the security recommendations for certain security standards.

As will be discussed in more detail below, data from the SCA source integrations 132 may be mapped with the data from the authoritative source integrations 134. This mapping may enable compliance testing to determine whether CIs 110 comply with the authoritative source recommendations. For example, scanner information from the SCA source integrations 110 may indicate that there is not a password complexity requirement configured for a particular CI 110. This data may be mapped with a NIST 800-53 requirement that indicates a minimum password complexity requirement. Because no minimum password complexity requirement is set on the CI 110, an indication that the CI 110 does not comply with NIST 800-53 may be generated automatically and presented via electronic notification (e.g., via an electronic dashboard).

Figure 2:
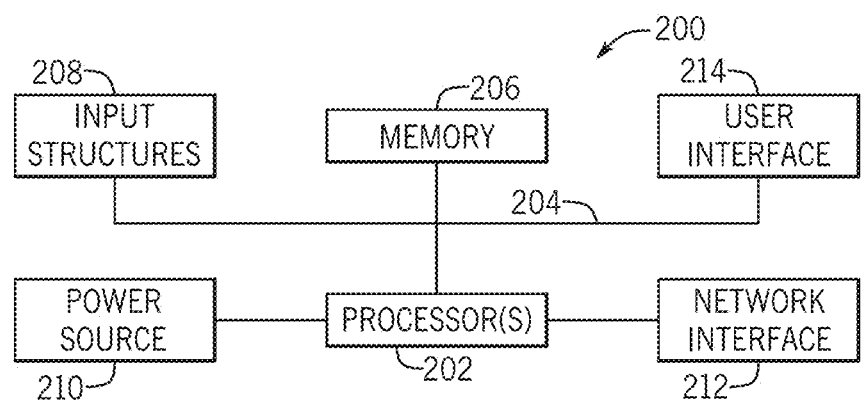
FIG. 2 is a block diagram of a computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other suitable circuitry for performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof.

Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

SCA Source Consumption

Figure 3:
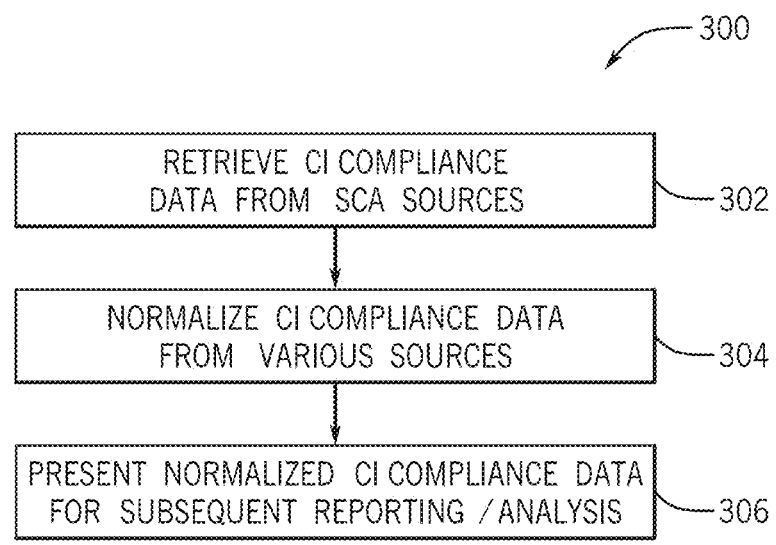
FIG. 3 is a flowchart, illustrating a process for providing Secure Configuration Assessment functionality, in accordance with an embodiment.

FIG. 3 is a flowchart, illustrating a process 300 for providing Secure Configuration Assessment functionality, in accordance with an embodiment. The process 300 begins by retrieving CI 110 compliance data from SCA source integrations 132 (block 302). For example, an application programming interface (API) may be used to access CI 110 scanner data from the SCA sources. The scanner data may include data indicative of configuration settings of the CIs 110. For example, the scanner data may provide an indication of password requirement settings, etc. for scanned CIs 110.

As mentioned above, the scanner data may be pulled from numerous SCA sources. The scanner data may vary from provider to provider. For example, the scanner data for one provider may classify a criticality of a scanned configuration setting as either: High, Medium, or Low, while another provides a criticality on a scale of 1-10. These two different scales may be normalized and stored as normalized data, enabling one scale to be used for all scanner data (block 304).

Figure 4:
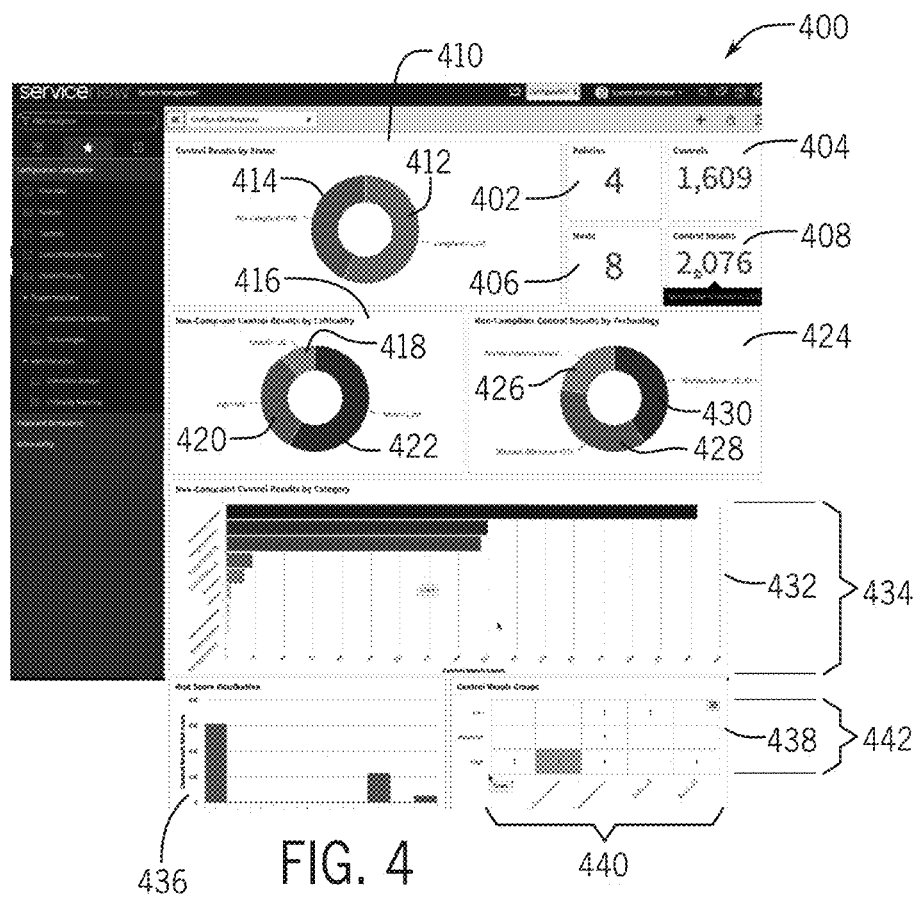
FIG. 4 is a block diagram illustrating a Secure Configuration Assessment (SCA) dashboard, in accordance with an embodiment.

Once the normalized scanner data is generated and stored, the normalized CI 110 compliance data may be presented for subsequent reporting/analysis (block 306). For example, a dashboard may provide an indication of the compliance data. For example, FIG. 4 is a block diagram illustrating a Secure Configuration Assessment (SCA) dashboard 400, in accordance with an embodiment. In the illustrated embodiment, a widget 402 illustrates a number of policies 402, a widget 404 provides a number of configuration tests, a widget 406 provides a number of hosts, and widget 408 provides a number of configuration test results. Policies, as used herein, refers to a set of configuration tests. Configuration tests, as used herein, refer to individual configuration characteristics that are scanned for certain CIs 110. For example, one configuration test may be a particular configuration setting for a password expiration requirement, password complexity requirement, etc. Hosts, as used herein, relates to CIs 110 that the configuration tests apply to (e.g., the CIs 110 that are scanned). The configuration test results, as used herein, relate to pass/fail results of a configuration test being applied to the hosts. For example, one result might indicate that a particular Windows Server does not comply with a configuration test that requires Windows Servers to have a minimum level of password complexity.

Additional widgets may be provided in the dashboard 400. Widget 410 provides an indication of the total number of the configuration test results that are in compliance, as indicated by a "Passed" value in portion 412. Further, the widget 410 provides an indication of the total number of the configuration test results that are not in compliance, as indicated by portion 414.

As may be appreciated, additional detail regarding non-compliant configuration test results may be desirable. Accordingly, additional breakdowns of non-compliant configuration test results may be provided via additional widgets. Widget 416 provides a breakdown of non-compliant configuration test results by criticality. For example, portion 418 provides a list of critical configuration test results, portion 420 provides a list of high criticality configuration test results, and portion 422 provides a list of low criticality configuration test results.

In some instances, particular technologies may exhibit unique non-compliant configuration test results. Widget 424 provides non-compliant configuration test results by technology. For example, portion 426 indicates non-compliant Ret Hat Enterprise servers, portion 428 indicates non-compliant Widows 2008 servers, and portion 430 provides non-compliant Windows 2012 servers.

Widget 432 provides a breakdown of non-compliant configuration test results by categories 434. Widget 436 provides a risk score distribution. The calculation of risk scores is discussed in more detail below. Widget 438 provides a mapping of configuration test result groups 440 to particular criticalities 442. Configuration test result groups are discussed in more detail below.

Figure 5:
FIG. 5 is an illustration of a graphical-user-interface (GUI) that provides a list of policies, in accordance with an embodiment.

Each of the widgets/portions of dashboard 400 may be selected to provide a relevant list associated with the widgets/portions. For example, selecting the widget 402 may result in a list of each of the four policies. FIG. 5 is an illustration of a graphical-user-interface (GUI) 500 that provides the list of policies, based upon selection of the widget 402, in accordance with an embodiment. As indicated by widget 402 in FIG. 4, four policies are present in the system 100. Thus, a list of four policies 502 are presented in GUI 500. Each of the policies 502 are made up of a set of configuration tests. For example, policy 504 is a first version of the NIST 800-53 Revision 4 policy for Microsoft Windows.

As previously discussed, the policies may be generated by users of the system 100 and/or may be provided by external sources (e.g., authoritative source integrations 134). An indication 506 of when the policy was added and/or updated from the integrations and/or system 100 editing may be provided.

Figure 6:
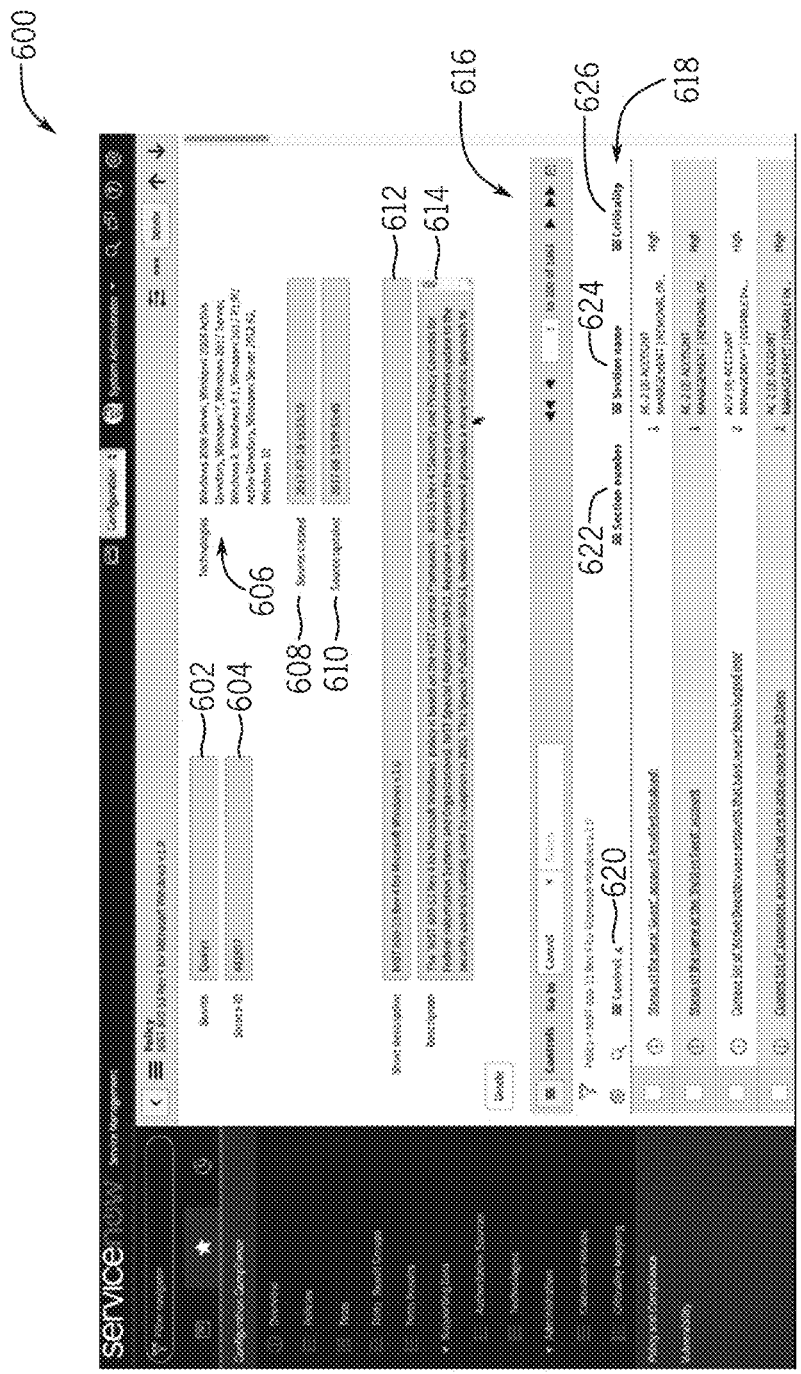
FIG. 6 is an illustration of a GUI drilldown into a selected policy from the list of policies of FIG. 5, in accordance with an embodiment.

Each of the polices is selectable, causing details of the selected policy. FIG. 6 is an illustration of a GUI 600 drilldown into a selected policy 504 from the list of policies 502 of FIG. 5, in accordance with an embodiment. A source indication 602 may identify the source where the policy was received from. For example, in the current embodiment, the policy was retrieved from a compliance software package of Qualys, Inc. of Redwood Shores, Calif. A source identifier 604 may identify a record in the Qualys system where the policy may be found. Further, applicable technologies 606, a creation date 608, and an update date 610 for the policy 504 may also be presented in the GUI 600 (e.g., as provided by the source system and/or system 100). A short description 612 may provide a brief overview of the policy 504 and the description 614 may provide a detailed description of the policy 504.

As mentioned above, policies are made up of a set of configuration tests. The configuration tests section 616 may provide a list 618 of all configuration tests associated with policy 504. The list 618 may provide a control descriptor 620 that provides a brief description of each of the configuration tests in the list 618.

Further, the configuration tests may be derived based upon a publication of the policy recommendations. For example, the NIST 800-53 standards may be part of a published document that describes these standards. The section number 622 and the section name 624 may provide a reference to section numbers and names of the published document, enabling reports to be generated that provide an indication of compliance/non-compliance with a particular section/section name of the publication.

In some situations, especially when there are a significant number of configuration tests, it may be desirable to prioritize them. For example, non-compliance with certain configuration tests may result in increased vulnerabilities over non-compliance with other controls. Accordingly, a criticality 626 may be associated with each of the configuration tests, indicating a level of vulnerability that may be introduced by non-compliance with the configuration test.

Figure 7:
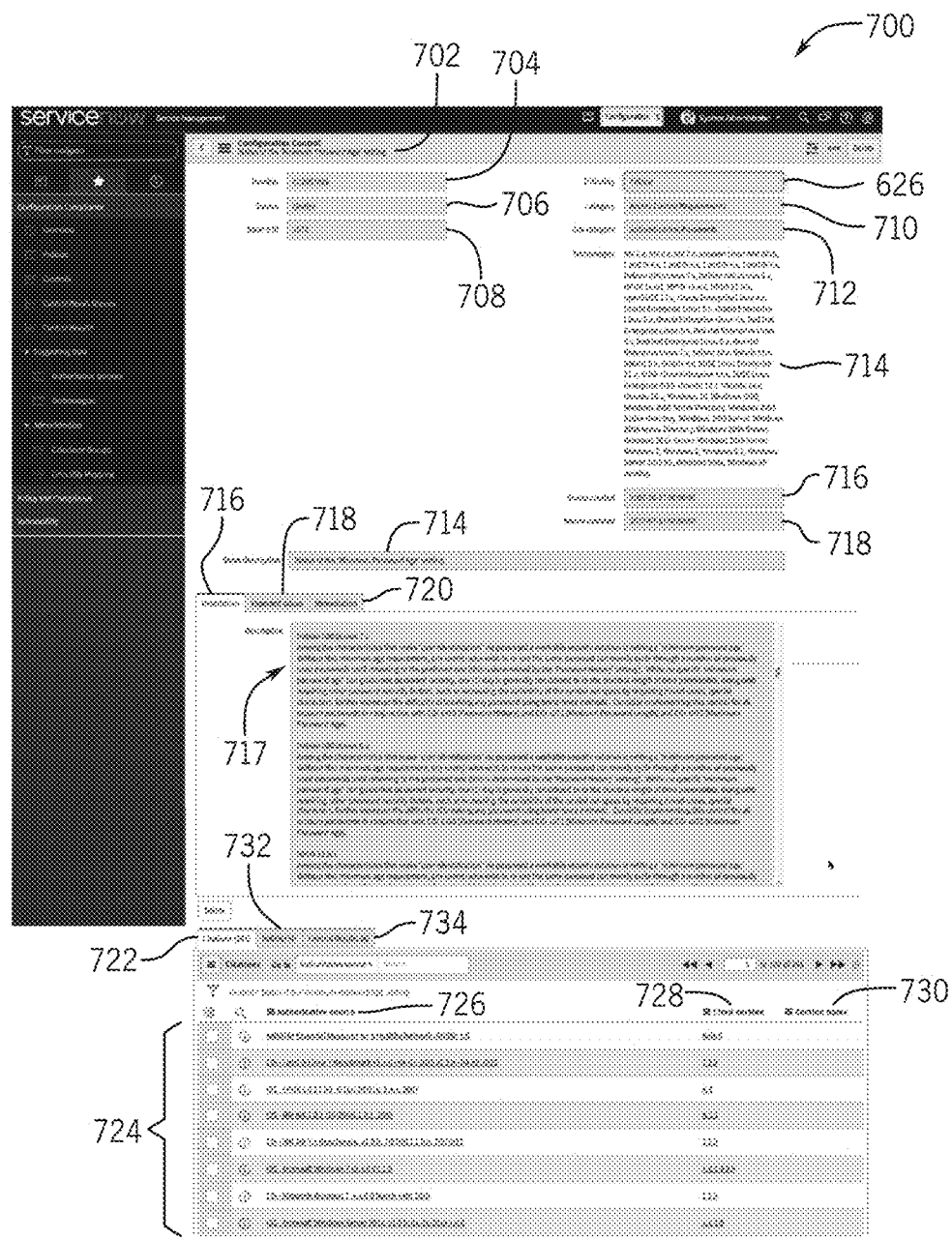
FIG. 7 is an illustration of a GUI that provides a control drilldown based upon a control selection from the GUI of FIG. 6, in accordance with an embodiment.

Each of the configuration tests in the list may be selected to further drilldown into details of the selected configuration test. For example, FIG. 7 is an illustration of a GUI 700 that provides a configuration test drilldown based upon a test selection from the GUI of FIG. 6, in accordance with an embodiment. In the depicted embodiment, a Maximum Password Age test has been selected, as indicated by the test descriptor 702. A unique identifier 704 of the test may be provided. Further, a source 706 of the test may be provided. As above, the source of the test, in this embodiment, is a software package by Qualys, Inc. A source identifier 708 may identify a record in the Qualys system where the test may be found. The criticality 626 may be set in GUI 700. Further, categories 710 and sub-categories 712 may be set.

The technologies 714 applicable to the test are also provided, along with a creation date 716 and an update date 718.

A short description 720 provides a brief summary of the configuration test. Here, the test checks the status of the "Maximum Password Age" setting for CIs 110 of the technologies 714. The description tab 716 may provide a description 717 of the test broken down by technology. The expected values tab 718 may provide a list of expected values for the different technologies. Further, the remediation tab 720 may provide a detailed list of remediation steps broken down by the different technologies. For example, the description 717 provides descriptions for Debian GNU/Linux 7.x, Debian GNU/Linux 8.x, and HPUX 11. The expected values tab 718 may provide values that are expected when systems with these technologies are scanned. Further, the remediation tab may provide a list of remediation steps for these technologies, when the configuration test results indicate non-compliance (e.g., when the scanner receives values that are not in the set of expected values).

The current drilldown proceeded from a policy selection to configuration test selection. However, many authoritative sources and policies may use a single test. For example, may standards may require a certain minimum password age for security compliance. Accordingly, the citations tab 722 may provide a list 724 of citations where the test's requirements may be found. The citation list 724 may include an authoritative source name 726, a cited section 728 of the authoritative source, and a section name 730 of the authoritative source. Each of the authoritative source names 726 may be selected, to provide a graphical rendering of the authoritative source for the user's reference.

Additionally, a policies tab 732 may be provided. The policies tab 732 presents a list of policies (e.g., similar to the list 502 of FIG. 5) that are associated with the current configuration test. Accordingly, a very easy summary of all policies affected by compliance/non-compliance with the test is provided.

Figures 8, 9:
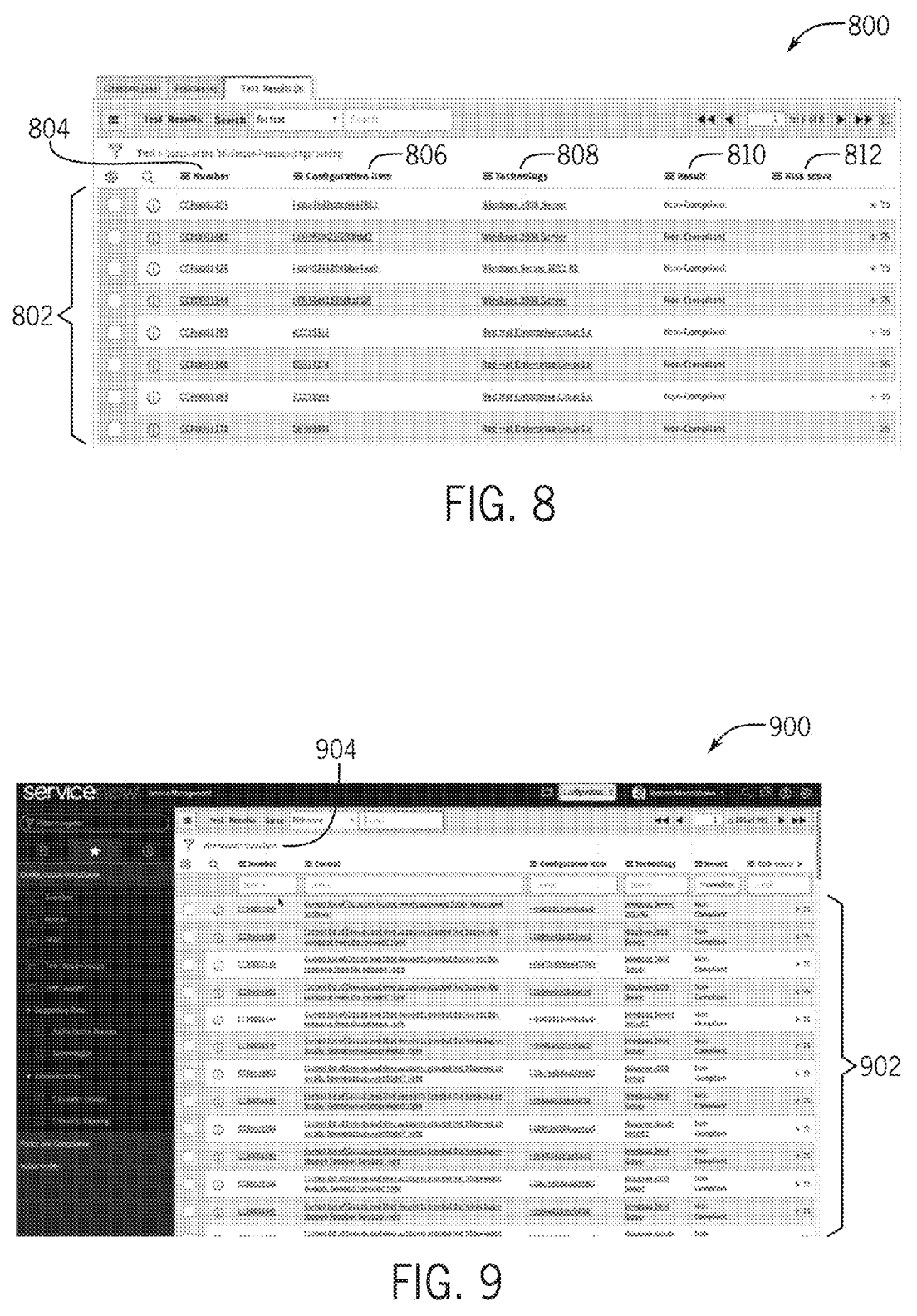

The configuration test results tab 734 may provide a list of test results for particular CIs 110 that the test is set to be evaluated against. FIG. 8 is an illustration of a GUI 800 rending of the Test Results tab 734 of the GUI 700 of FIG. 7, in accordance with an embodiment. As illustrated, the Test Results tab 734 provides a list 802 of test results when tests are performed on particular CIs 110. For example, eight evaluations of the configuration test of FIG. 7 have been performed. The list 802 provides a unique identifier 804 for each test result. Further, an indication 806 of the particular CI 110 that the configuration test was performed on is provided. The technology 808 of the particular CI 110 is also provided. If the configuration test evaluation receives expected results, as discussed above, the configuration test result status 810 is compliant (an actual value of "Passed"). Otherwise, the configuration test result status 810 is non-compliant (an actual value of "Failed", "Error" or "Unknown", etc.). A risk score 812 is also provided, which provides a prioritization of the configuration test results for remediation. Calculation of the risk score 812 is discussed in more detail below.

FIG. 9 is an illustration of a GUI 900 that illustrates a list of configuration test results 902 after a non-compliant (i.e. not "Passed") filter 904 is applied, in accordance with an embodiment. As may be appreciated, as the number of CIs 110 grow and the number of compliance standards grow, the list of configuration test results may grow. As illustrated in the GUI 900, the test results may be filtered based upon certain criteria, such as non-compliance, risk score, etc. The test results may be sorted based upon various criteria. Here, the test results are sorted by a descending risk score. The descending risk score may provide higher-risk non-compliant items at the top of the list 902, descending to the lowest-risk compliant items at the bottom of the list 902.

Calculating the Risk Score

Figure 10:
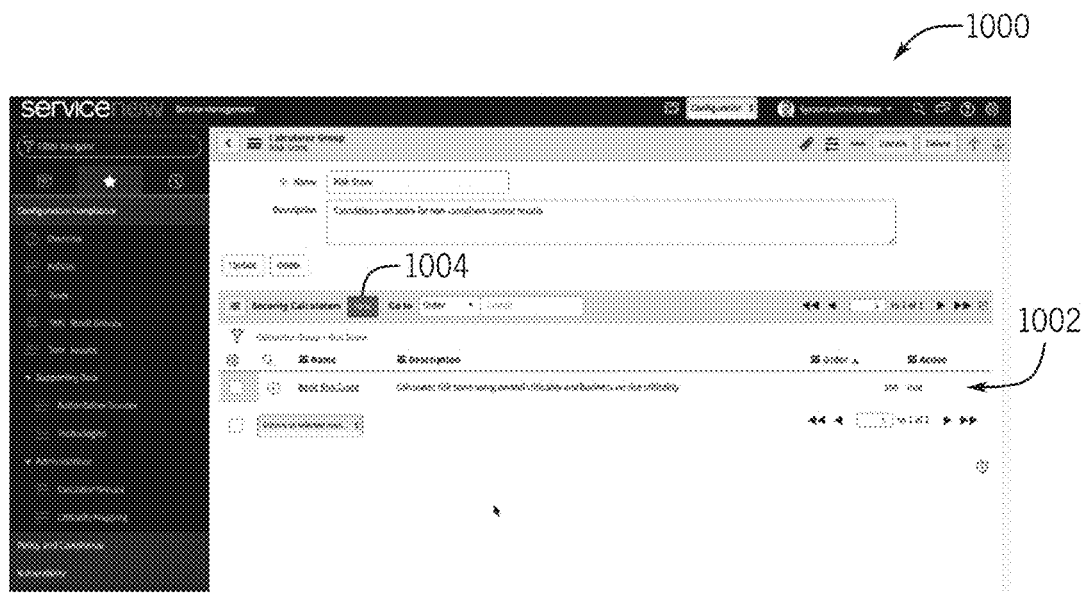
FIG. 10 is an illustration of a Risk Score Calculator dialog box, in accordance with an embodiment.

There may be numerous ways of calculating and assigning risk to various configuration test results. The system 100 may enable users to generate multiple risk calculation mechanisms to assign risk to test results. FIG. 10 is an illustration of a Risk Score Calculator dialog box 1000, in accordance with an embodiment. The Risk Score Calculator dialog box 1000 enables a user to use one or more risk calculators to attribute a risk score with test results. The system 100 may come pre-packaged with a default risk calculator 1002, labelled here as the "Basic Risk Score" calculator. New calculators may be implemented using the "New" icon 1004, which provides a dialog box for a user to enter a script to perform risk calculations for the various test result records.

Figure 11:
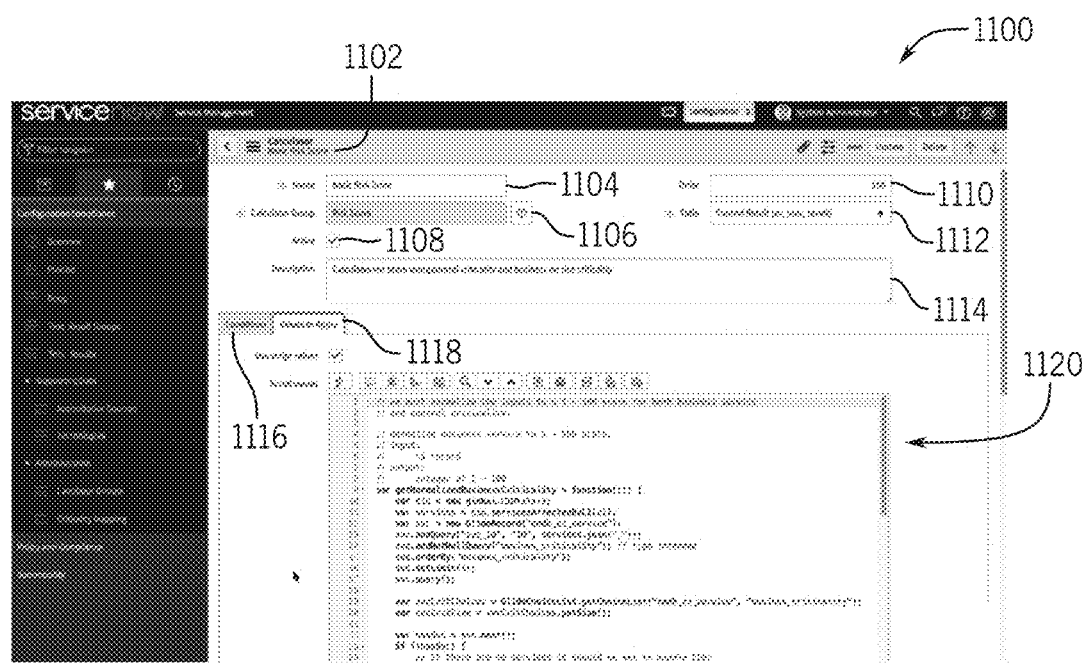
FIG. 11 is an illustration of a calculator editor, in accordance with an embodiment.

Calculators may be edited as well. FIG. 11 is an illustration of a calculator editor dialog box 1100, in accordance with an embodiment. The calculator editor dialog box 1100 may be quite similar to the new calculator dialog box that is rendered when the "New" icon 1004 is selected, except that the calculator editor dialog box 1100 is pre-populated with previously entered data related to the calculator that is being edited. Here, the "Basic Risk Score" calculator has been selected for editing, as indicated by the calculator descriptor 1102 and the calculator name field 1104. Numerous types of calculators may be generated via the calculator editor. Accordingly, a calculator group 1106 may be set to indicate that the current calculator is a Risk Score calculator. As mentioned above, multiple Risk Score calculators may be generated. The Order field 1110 enables selection of a particular scoring order (e.g., 1-100 here). The table field 1112 indicates which table the risk scoring should be applied to. Here, the risk scoring is applied to the configuration test results (which are stored in the Configuration Test Results table). The description field 1114 provides a brief description of the calculator. The conditions tab 1114 allows a user to select certain conditions of the table that define the risk score, while the Values to Apply tab 1118 provides a script editor 1120 that enables a user to extract values and perform scripted calculations on the extracted values to define a configuration test result's risk score.

Figure 12:
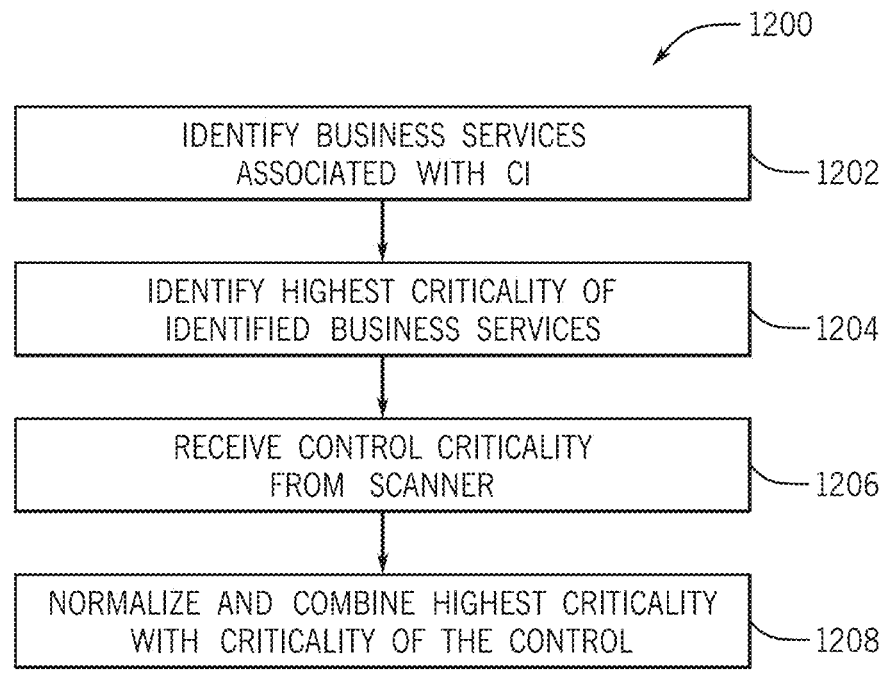
FIG. 12 is a flowchart, illustrating a process for providing a prioritization of non-compliant test results, in accordance with an embodiment.

FIG. 12 is a flowchart, illustrating a process 1200 used by the "Basic Risk Score" calculator for providing a prioritization of non-compliant configuration test results, in accordance with an embodiment. The process 1200 is implemented in the script editor 1120 of FIG. 11.

To understand risk of non-compliance to the system 100, the process 1200 begins by identifying the business services associated with the CI 110 of the configuration test result to be scored (block 1202). In one embodiment, the CMDB may provide a set of business services dependent upon a particular CI 110. For example, for a configuration test result of a particular Windows Server, the associated business services associated with the Windows Server are identified.

Next, a criticality of the identified business services is identified (block 1204). For example, if the Windows Server is associated with four business services, the highest criticality of the four business services is identified.

A criticality of the configuration test evaluated by the configuration test result is also retrieved (block 1206). For example, the SCA sources that provide the configuration test may also associate a criticality with the configuration test and/or a user may manually enter/update a criticality of the configuration test within the system 100.

The highest criticality of the business services and the criticality of the configuration test are normalized to the order 1110 of FIG. 11. For example, High Medium, and Low criticalities may be ordered to 100, 50, and 0 on a 100 order. The normalized criticalities are then combined (e.g., via averaging, accumulation, maximization, etc.) to determine a finalized risk score (block 1208).

Additional Control Results Drilldowns

Figure 13:
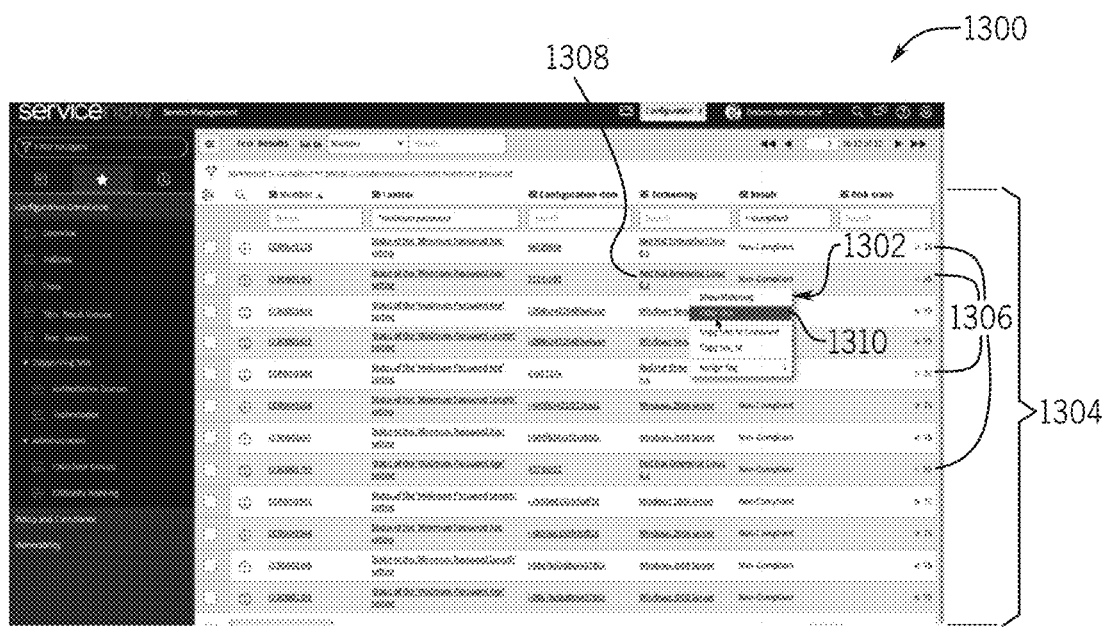
FIG. 13 is an illustration of a GUI for performing a secondary filtering, in accordance with an embodiment.

As may be appreciated, the number of available configuration test results may be numerous, especially in systems with a large number of CIs 110. Accordingly, additional filtering/groupings may be provided to reach a particularly relevant set of test results. FIG. 13 is an illustration of a GUI 1300 for performing a secondary filtering to reach a reduced subset of test results, in accordance with an embodiment. In the GUI 1300, a secondary menu 1302 enables secondary filtering of a filtered list 1304 of test results. For example, in this particular example, the Red Hat Enterprise Linux 6.x servers provide support for business services with a low criticality, resulting in a reduced risk score, as indicated by risk scores 1306. Thus, the user may wish to filter out this technology group. Accordingly, the user right clicks (or provides some other secondary menu trigger) on one of the "Red Hat Enterprise Linux 6.x" technology indicators 1308, resulting in the secondary menu 1302. Upon selection of the "Filter Out" option 1310, the test results with the technology area of Red Hat Enterprise Linux 6.x are removed from the list 1304 of control results.

Figure 14:
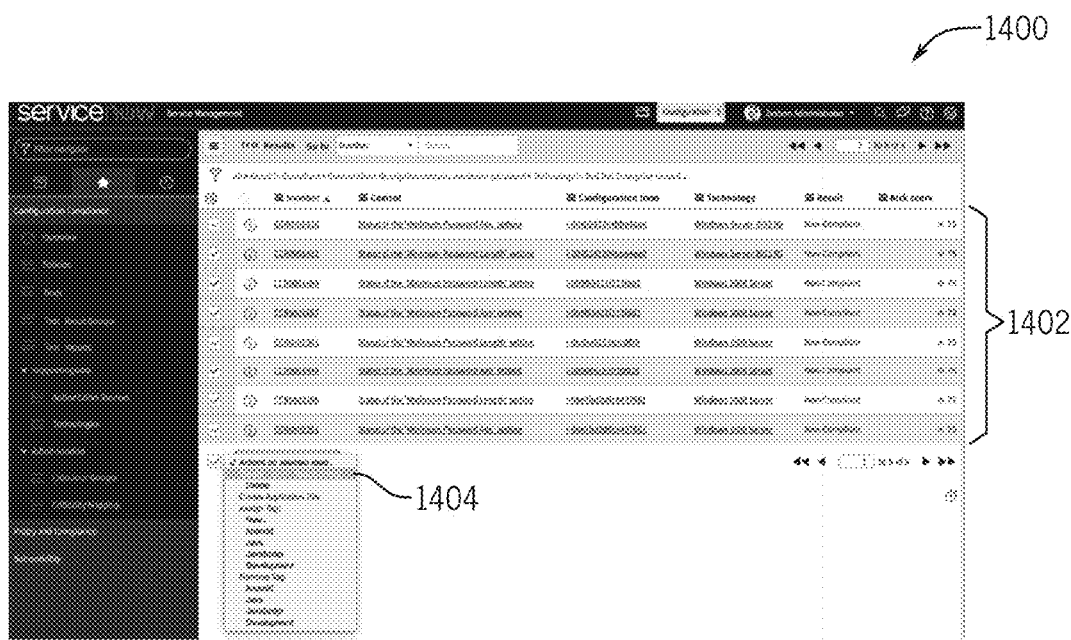
FIG. 14 is an illustration of a GUI for grouping test results, in accordance with an embodiment.

FIG. 14 is an illustration of a GUI 1400 that provides the updated list 1402 of configuration test results after the secondary filtering. Additionally and/or alternatively, the user may also group test results. For example, upon selecting a set of test results to group (e.g., here, all of the secondary filtered control results), the user may select option 1404 to create a configuration test result group.

Figure 15:
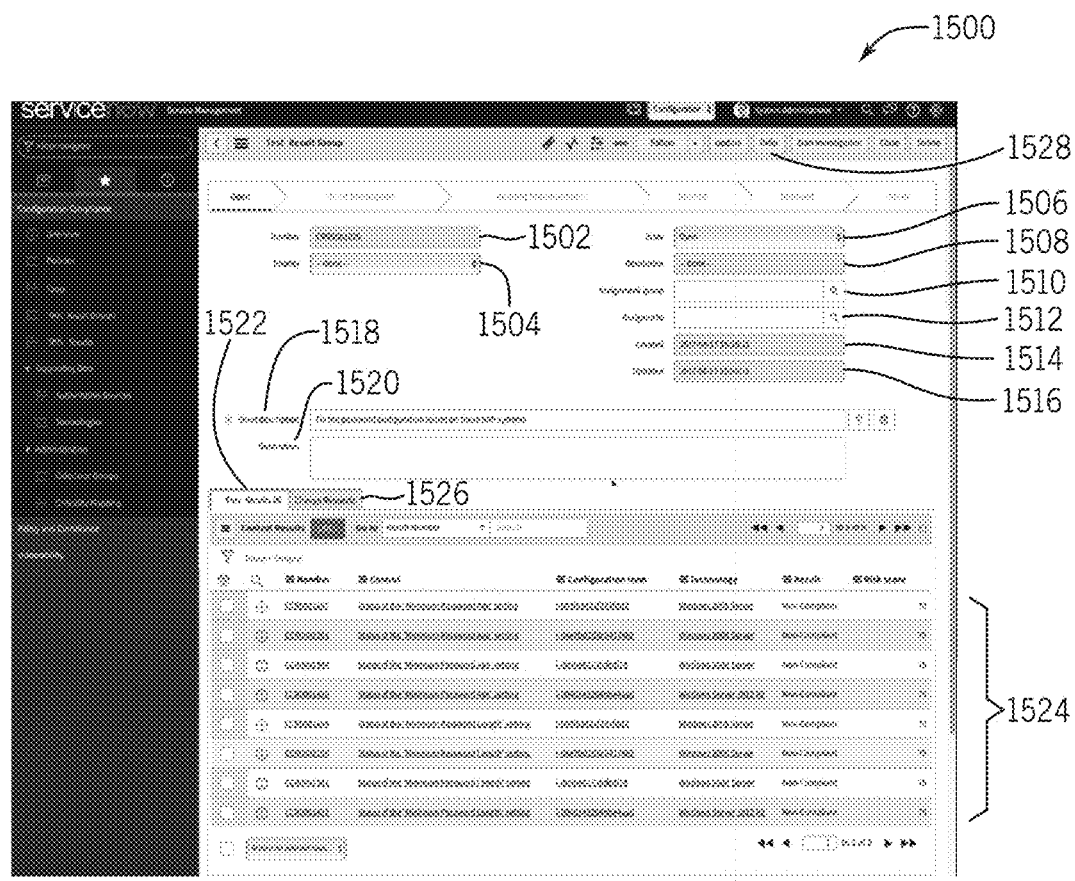
FIG. 15 is an illustration of a GUI for facilitating creation of the test result group, in accordance with an embodiment.

Upon requesting the creation of a configuration test result group (e.g., via option 1404), the test result group GUI 1500 of FIG. 15 may be presented. The GUI 1500 may present a unique identifier 1502 for the group. Further, the GUI 1500 may provide a priority selector 1504 to select a priority to be assigned to the group. A state selector 1506 may be provided to select a state to be assigned to the group (e.g., open, under investigation, awaiting implementation, deferred, resolved, closed, etc.). A resolution selector 1508, assignment group selector 1510, assigned to selector 1512, creation date field 1514, updated date field 1516, short description field 1518, and description field 1520 may also be provided. A Test Results tab 1522 may provide a list 1524 of all of the test results that are part of the group. Further, a Change Requests tab 1526 may provide a list of change requests associated with the group.

Figure 16:
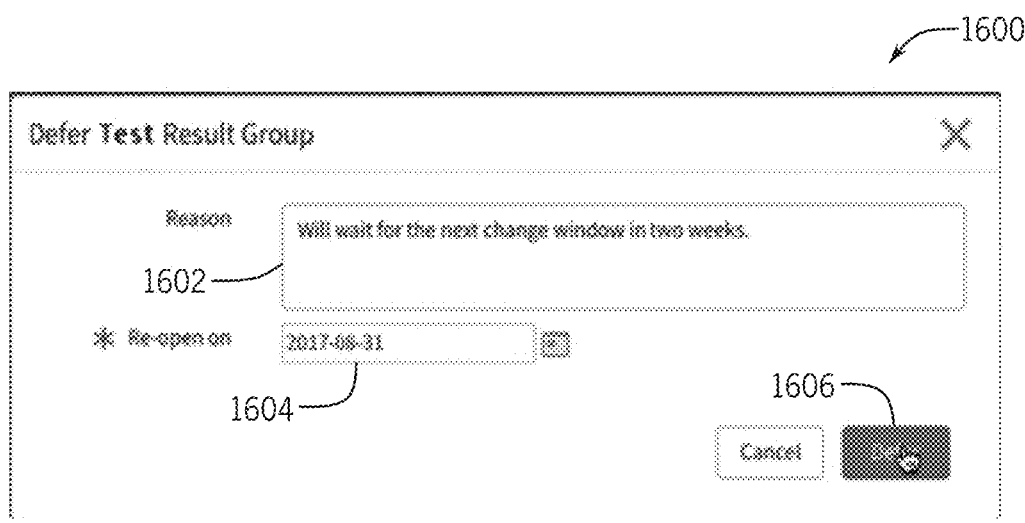
FIG. 16 is an illustration of a deferral dialog box, in accordance with an embodiment.

In some situations, it may be useful to defer action to reach compliance with a certain set of configuration test results. For example, an upcoming change window may be approaching for CIs 110 associated with less-critical test results. In such a case, it may be more beneficial to wait until the upcoming change window to implement the change. Accordingly, a "Defer" option 1528 may be provided, which may result in silencing the non-compliance status for a deferral period. FIG. 16 is an illustration of a deferral dialog box 1600 triggered by the option 1528, in accordance with an embodiment. As illustrated, the deferral dialog box 1600 provides a reason field 1602 along with a duration indication field 1604. The reason field 1602 enables the user to provide a justification for the deferral. In our example, the deferral is due to an upcoming change window. Additionally, the duration indication field 1604 provides an indication when the deferral should end (e.g., two weeks out). Upon selection of the Defer option 1606, the non-compliance status may be silenced or otherwise deferred until the time indicated by the duration indication field 1604 is reached.

Figure 17:
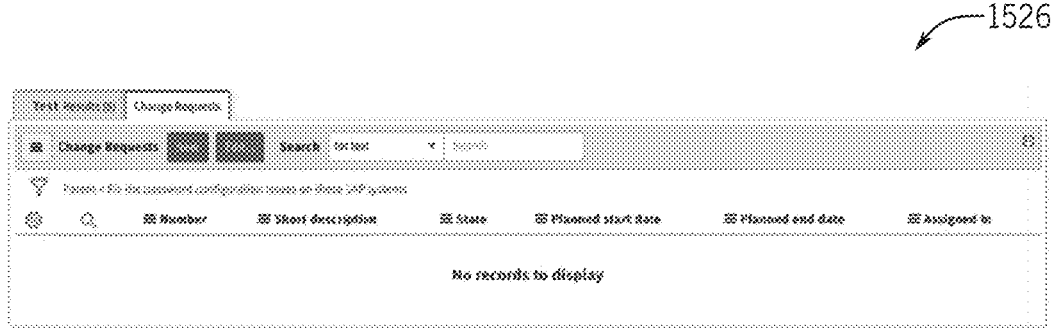
FIG. 17 is an illustration of a GUI for facilitating change requests based upon the test result group, in accordance with an embodiment.

In some situations, it may be useful to generate change requests to solve non-compliance issues. FIG. 17 is an illustration of the change requests tab 1526 for facilitating change requests based upon the configuration test result group, in accordance with an embodiment. A change request may be generated to request that operations personnel adjust a password setting on the CIs 110 of the configuration test result group to conform with the expected results of the configuration test. By bundling the configuration test results into a group, a single change request interaction may be used to drive the target change for a set of CIs 110. Further, because the CI 110 information, remediation, etc. are already associated with the test results, the change request may auto-populate the system and action for the change request.

Governance Risk and Compliance Integration

Governance, risk, and compliance (GRC) is a constant concern for enterprises that must keep up with changes in the global regulatory environment and industry standards. As enterprises adopt new business models, establish new partner relationships, and deploy new technologies, they must also quickly assess the impact of these developments on their existing compliance obligations and risk posture.

For critical processes, enterprises must be able to continuously monitor and detect failing controls, especially between assessment periods. They must detect emerging risks and adjust controls and policies accordingly. Compressing the time to monitor, detect, and assess changes to the risk and compliance posture is only one side of the equation. Once a decision is made, enterprises must orchestrate and automate the appropriate remediation and risk treatment actions across business and IT processes.

Figure 18:
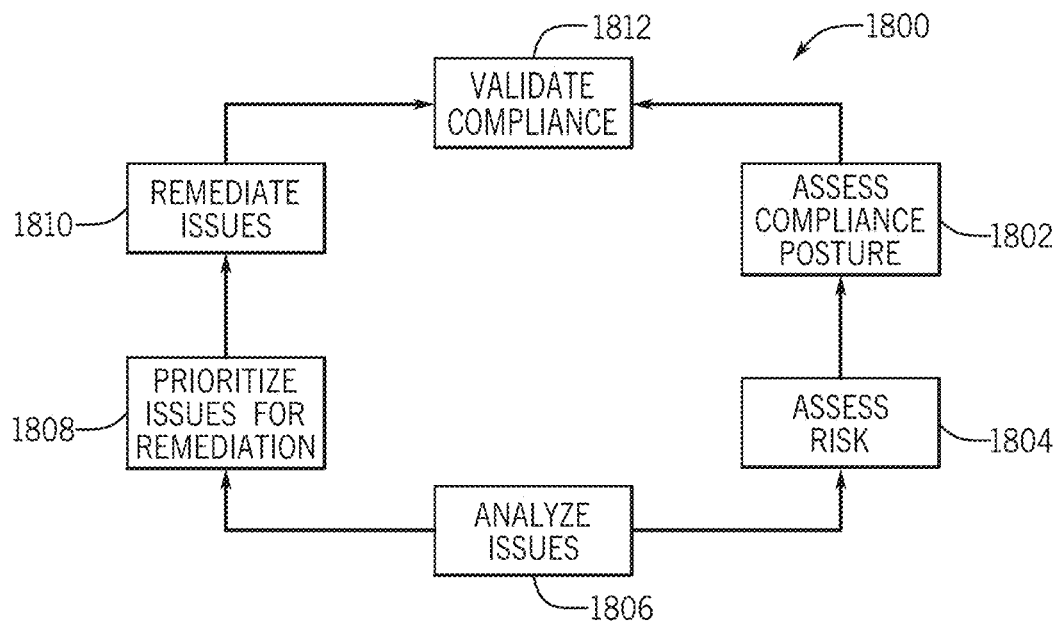
FIG. 18 is a flowchart, illustrating a cyclical compliance analysis process, in accordance with an embodiment.

FIG. 18 is a flowchart, illustrating a cyclical GRC process 1800, in accordance with an embodiment. The GRC process 1800 begins by assessing the compliance posture (block 1802). Next, the non-compliance risk is assessed (block 1804). Issues are then analyzed and prioritized for remediation (blocks 1806 and 1808). The issues are then remediated and compliance is validated (blocks 1810 and 1812). The process 1800 may be enhanced by tying SCA tool references into GRC tools, as discussed in more detail below.

Figure 19:
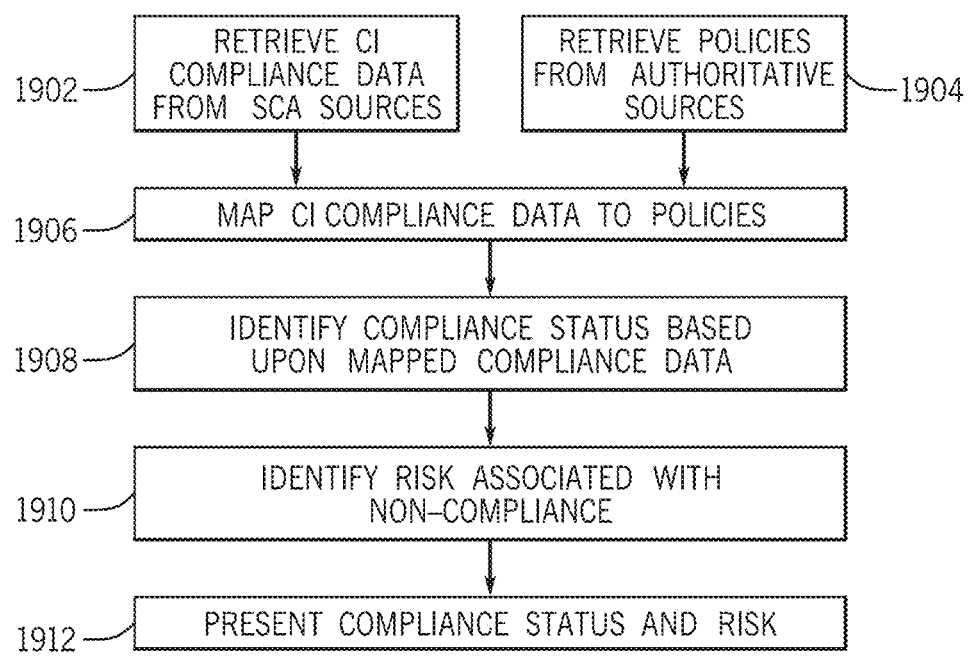
FIG. 19 is a flowchart, illustrating a process for identifying/reporting a compliance status and risk, in accordance with an embodiment.

FIG. 19 is a flowchart, illustrating a process 1900 for identifying/reporting a compliance status and risk, using SCA source integrations 132 and/or authoritative source integrations 134, in accordance with an embodiment. The process 1900 begins by retrieving CI compliance data from SCA source integrations 132 and retrieving policies from authoritative source integrations 134 (blocks 1902 and 1904). As mentioned above, the CI compliance data may include configuration tests and/or configuration test results for particular CIs 110. The policies may include particular requirements/recommendations for particular security standards.

Figure 20:
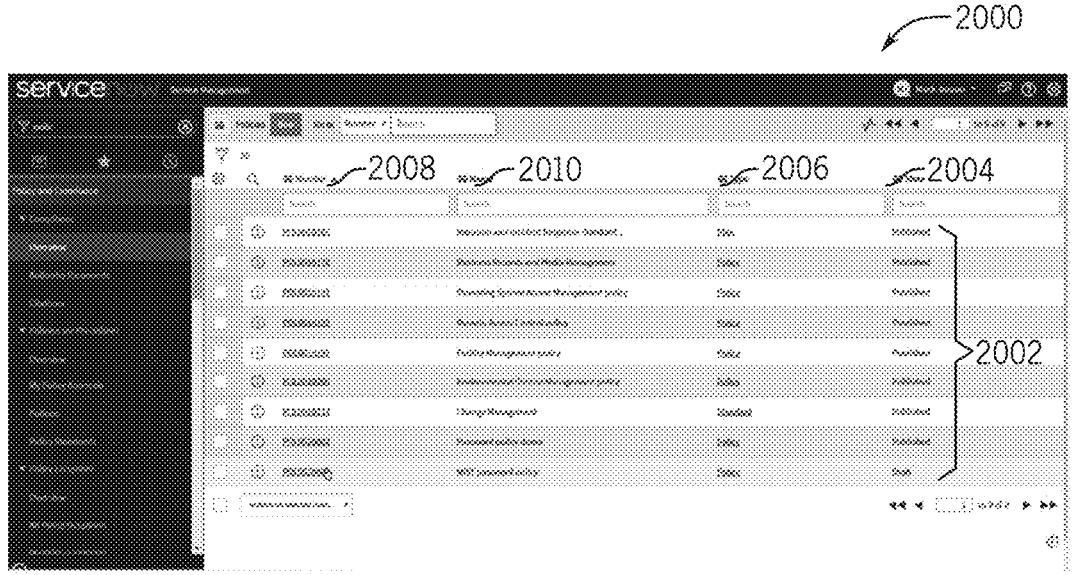
FIG. 20 is an illustration of a GUI that provides a list of policies, imported electronically from an authoritative source, in accordance with an embodiment.

FIG. 20 is an illustration of a GUI 200 of a GRC tool that provides a list of policies 2000, imported electronically from an authoritative source, via one or more authoritative source integrations 134 and/or generated manually in the system 100, in accordance with an embodiment. As illustrated by the state field 2004, both published and drafted policies may be integrated into the system 100. Further, as indicated by the type field 2006, policies may actually be policies, plans, and/or standards provided by an authoritative source. A plan number 2008 and name 2010 may also be provided.

Figure 21:
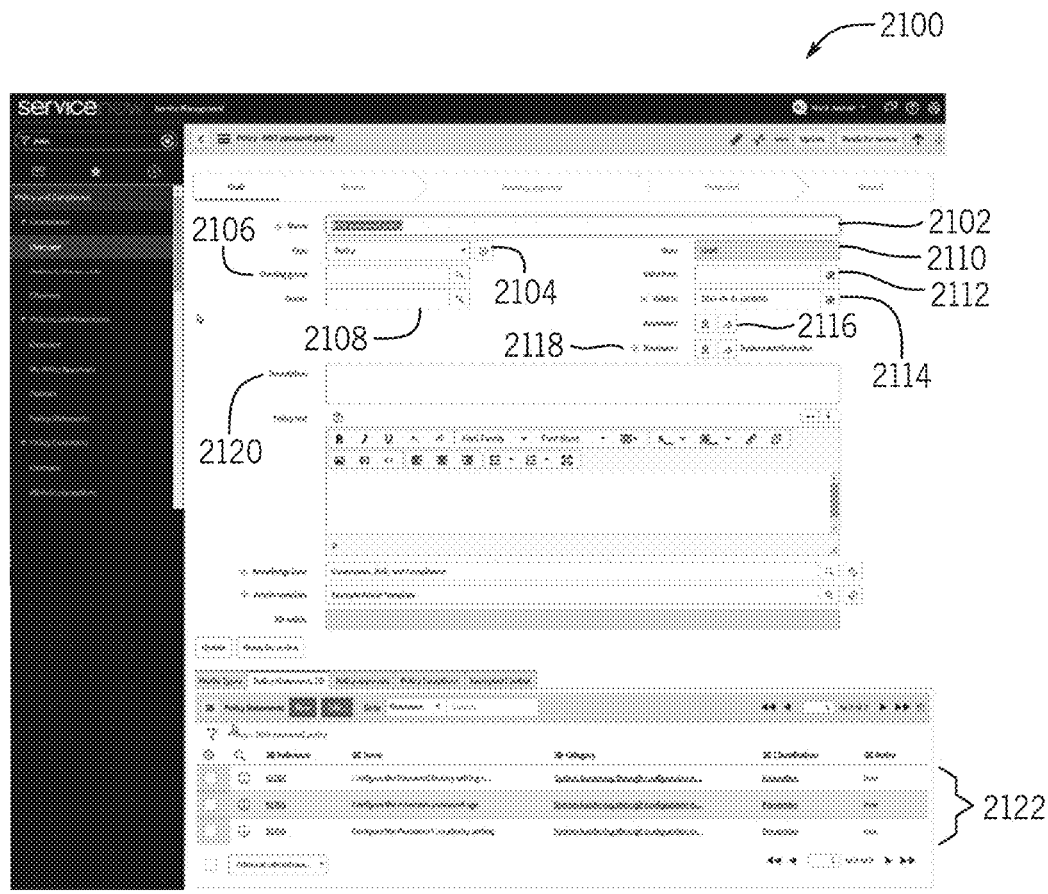
FIG. 21 is an embodiment of a GUI that provides a drilldown into a particular policy detail, in accordance with an embodiment.

As mentioned above, selection of a particular policy may result in presentation of policy details. FIG. 21 is an embodiment of a GUI 2100 of a GRC tool that provides a drilldown into a particular policy detail, in accordance with an embodiment. As illustrated, the GUI 2100 provides many parameters for the policy, including name 2102, type 2104, owning group 2106, owner 2108, state 2110, a valid from date 2112, a valid to date 2114, approvers 2116, reviewers 2118, a description 2120, etc. The GUI 2100 also includes a list of policy statements 2122, which provide the individual requirements for the policy. These policy statements 2122 may correlate with the previously mentioned configuration tests that may be tested against CIs 110 to obtain configuration test results indicative of whether the policy statements 2122 are met.

Figure 22:
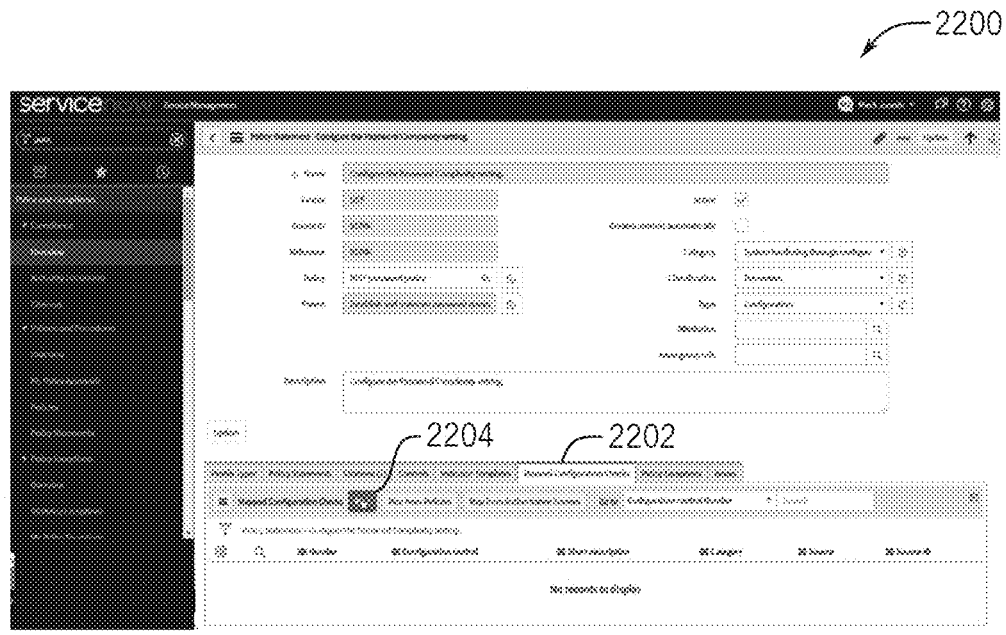
FIG. 22 is an illustration of a GUI for mapping configuration tests to a selected policy statement, in accordance with an embodiment.
Figure 23:
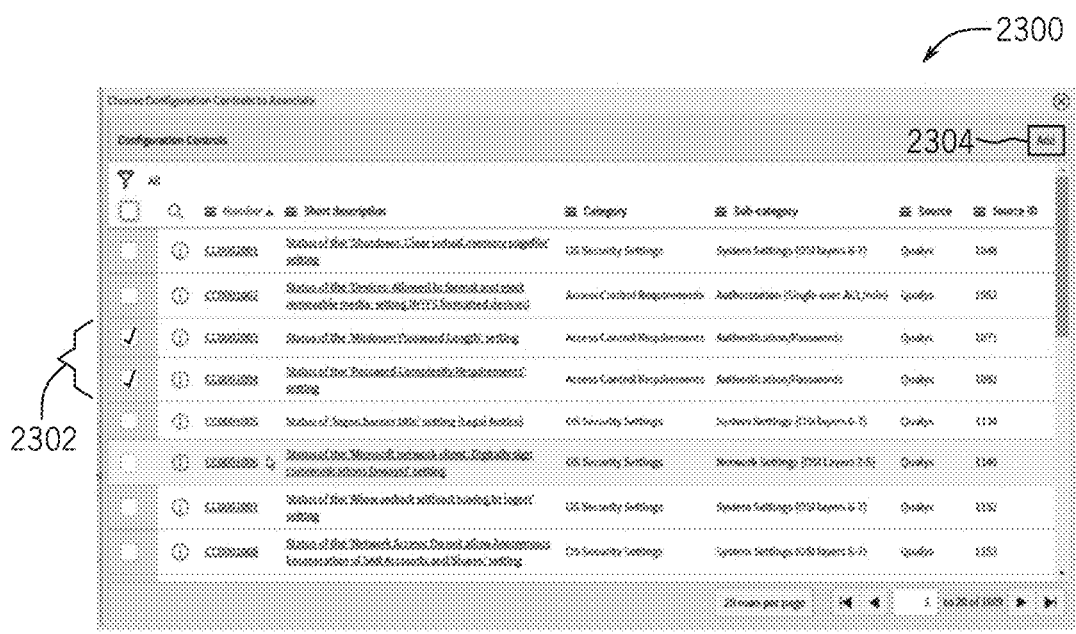
FIG. 23 is an illustration of a GUI that provides a control selection for controls to associate with the selected policy statement, in accordance with an embodiment.
Figure 24:
FIG. 24 is an illustration of the GUI of FIG. 22, after configuration tests are associated with the policy statement, in accordance with an embodiment.

Returning to the process 1900, the received CI compliance data is mapped to the received policies (block 1906). FIG. 22 is an illustration of a GUI 2200 for mapping configuration tests to a selected policy statement, in accordance with an embodiment. When a policy statement from the list 2122 of FIG. 21 is selected, the policy statement's details are presented. Of particular interest, a Configuration Tests tab 2202 is provided that enables configuration tests to be mapped to the selected policy statement. Upon selection of the "Add" icon 2204 a control selection dialog box 2300 is presented for the selection of configuration tests to associate with the selected policy statement, in accordance with an embodiment. Upon selection of configuration tests (e.g., controls 2302) and, optionally, confirming the selection (e.g., via the "Add" icon 2304), the controls 2302 are added to the Configuration Tests tab 2202, as illustrated in FIG. 24.

Figure 25:
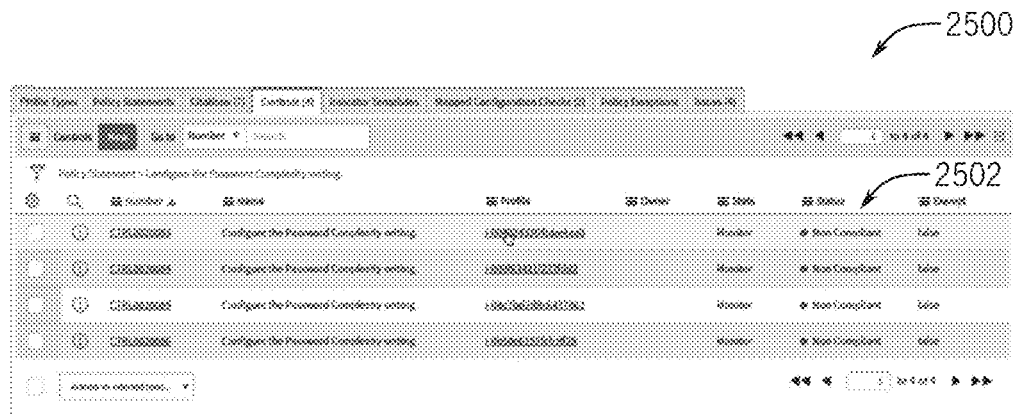
FIG. 25 is an illustration of the Controls tab of the GUI of FIG. 22 illustrating the compliance status of controls (e.g., the compliance status), which is determined by the configuration test results from the scanner, in accordance with an embodiment.
Figure 26:
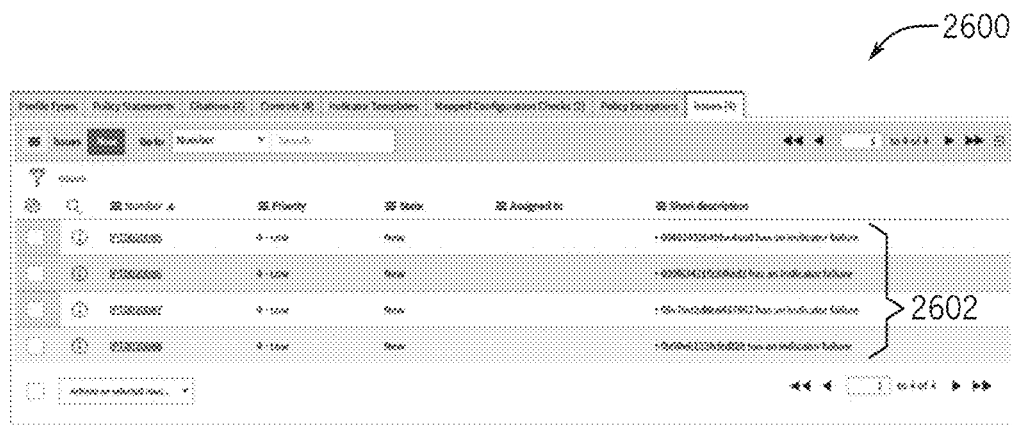
FIG. 26 is an illustration of the Issues tab of the GUI of FIG. 22, illustrating actionable items for remediating non-compliant controls determined by configuration test results from the scanner, in accordance with an embodiment.

Returning to process, 1900, using the mapped CI compliance data and policy data, policy compliance status may be determined (block 1908). FIG. 25 is an illustration of the Controls tab 2500 of the GUI of FIG. 22, illustrating the compliance status of controls (e.g., the compliance status 2502), which is determined by the configuration test results from the scanner (e.g. the CI compliance data from the SCA source integrations 132), in accordance with an embodiment. As illustrated, for the particularly selected policy statement, each of the four controls indicates non-compliance. This is further illustrated in the issues tab 2600 of GUI 2200, which indicates a list of issues 2602 (e.g., un-expected results from the control test on a particular CI 110). For reporting at the policy level, if any configuration test results for controls associated with a particular policy indicate non-compliance, the compliance status may be set to non-compliant.

Returning to the process 1900, a level of risk may be identified for non-compliance (block 1910). For example, as discussed above, with regard to FIGS. 10-12 a number of factors (e.g., including affected business services and control criticality) may be used to identify the associated risk. Once the compliance status and risk are identified, they may be presented for quick reporting of the risk and compliance of the system 100 (block 1912). For example, criticality levels and non-compliant controls may be presented via widgets on a user's dashboard.

Figure 27:
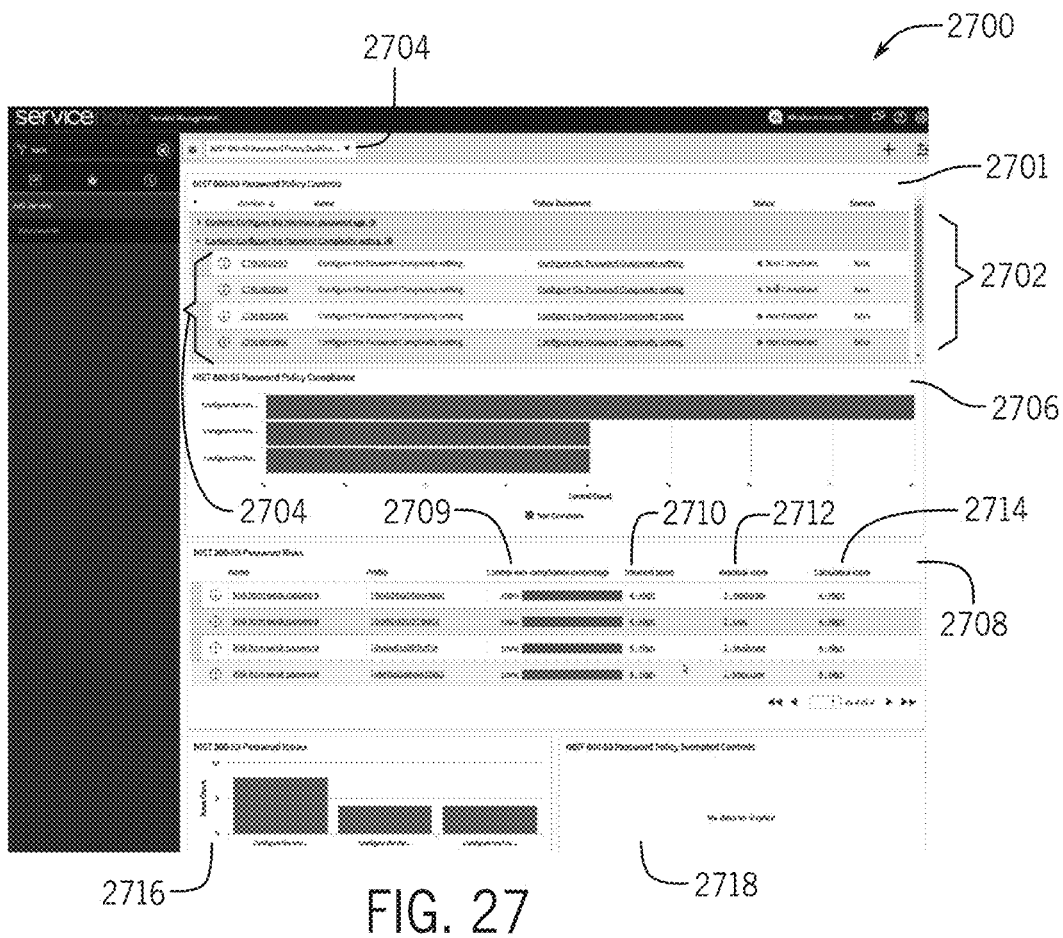
FIG. 27 is an illustration of a GUI for a control owner for the CIs that are not in compliance with a policy, in accordance with an embodiment.

FIG. 27 is an illustration of a GUI 2700 for a control owner for the CIs that are not in compliance with a policy, in accordance with an embodiment. The GUI 2700 may include a widget 2701 with a list of policy statements 2702 for a particularly selected policy 2704. The GUI 2700 may include a list of controls 2704 for each of the policy statements in the list of policy statements 2702.

A second widget 2706 may provide an indication of compliant and non-compliant controls for each of the policy statements. Here, all of the controls associated with the policy statements are non-compliant, which indicates that remediation is needed.

Widget 2708 provides an indication of the risks associated with the non-compliant control results. As illustrated, a control non-compliance percentage 2709 is presented. The inherent scoring 2710 (e.g., the scoring of the control result) and the residual scoring 2712 (e.g., the scoring of the affected business services as indicated by the system 100) may be maximized (e.g., taking the highest of the two associated scores for a non-compliant control result) and weighted by the control non-compliance percentage 2709 to define the calculated score 2714. Because the inherent score 2710 for each of the non-compliant control results is high, the calculated score 2714 is high, despite some non-compliant control results having lower residual scores 2712. Other methods may be used for determining the calculated scores 2714, such as weighted averaging, etc.

The widget 2716 provides an issue count for each of the policy statements (e.g., as determined based upon the compliance status of controls associated with each of the policy statements). Further, widget 2718 provides a list of exempted controls, which are controls that are subject to a policy exemption and are silenced from non-compliance reporting for a certain duration, which will be discussed in more detail below.

Figure 28:
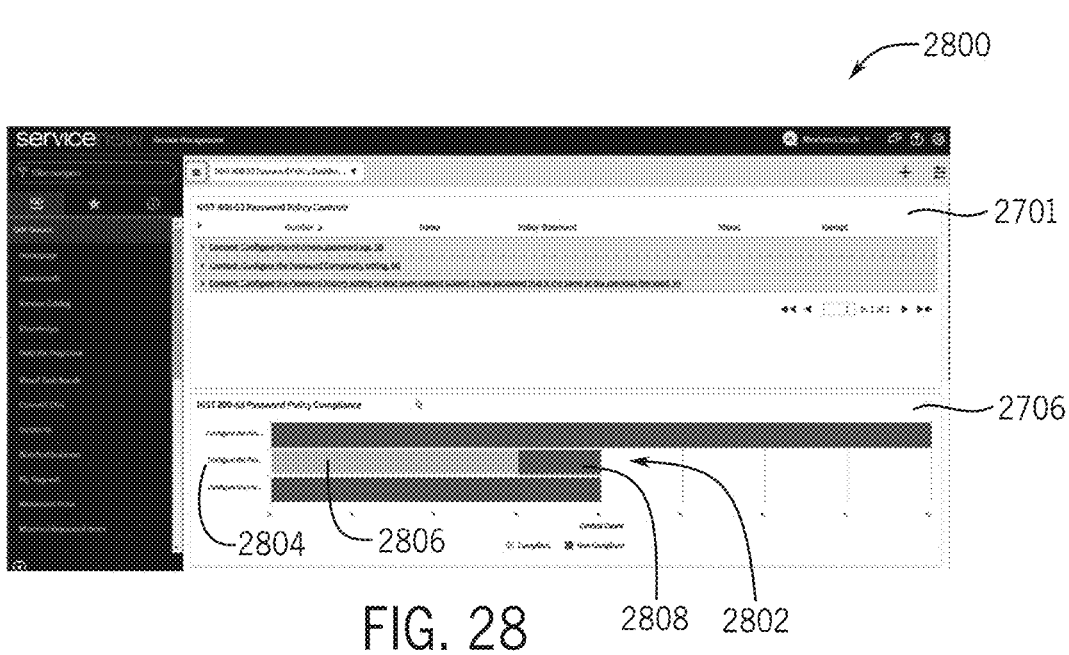
FIG. 28 is an illustration of the GUI of FIG. 27, after remediation of the non-compliance on three of the CIs (e.g., via operations personnel), in accordance with an embodiment.

As mentioned above, non-compliance and/or issue reporting via the widgets 2701, 2706, 2708, 2716, and 2718 may indicate that remedial measures should be taken. Accordingly, operations personnel may perform remedial measures (e.g., adjusting the password complexity requirements on the non-compliant CIs 110). FIG. 28 is an illustration of an updated GUI 2800 representative of a portion of the GUI 2700 of FIG. 27, after remediation of non-compliance on three of the CIs 110 for one of the policy statements (e.g., via operations personnel), in accordance with an embodiment. As illustrated, the widget 2706 presents an updated bar graph 2802 for the modified compliance of the policy statement 2804, indicating (via compliance bar 2806 and non-compliance bar 2808), in near real time, the new compliance of three of the CIs 110 (e.g., based upon remediation efforts by the operations personnel). Thus, compliance progress may be provided without relying on user auditing and/or reporting.

Policy Exemptions

As mentioned above, one of the issues was not remediated by the operations personnel. For example, the operations personnel may not be able to bring the remaining non-compliant CI 110 into compliance, for example, because the non-compliant CI 110 is operating under older technology that does not support the level of complexity that is required by the policy statement, it may be beneficial to provide a policy exemption, which causes the non-compliance to be silenced for a duration of time. This may allow known-non-compliance to be silenced for a planned duration of time to enable longer-term remedial efforts. Such silencing may work to increase the effectiveness, by removing expected non-compliance from presentation, such that un-expected non-compliance may be emphasized. Further, the exemption process may provide safeguards by re-instituting the non-compliance notification after the specified duration of the exemption is reached.

Figure 29:
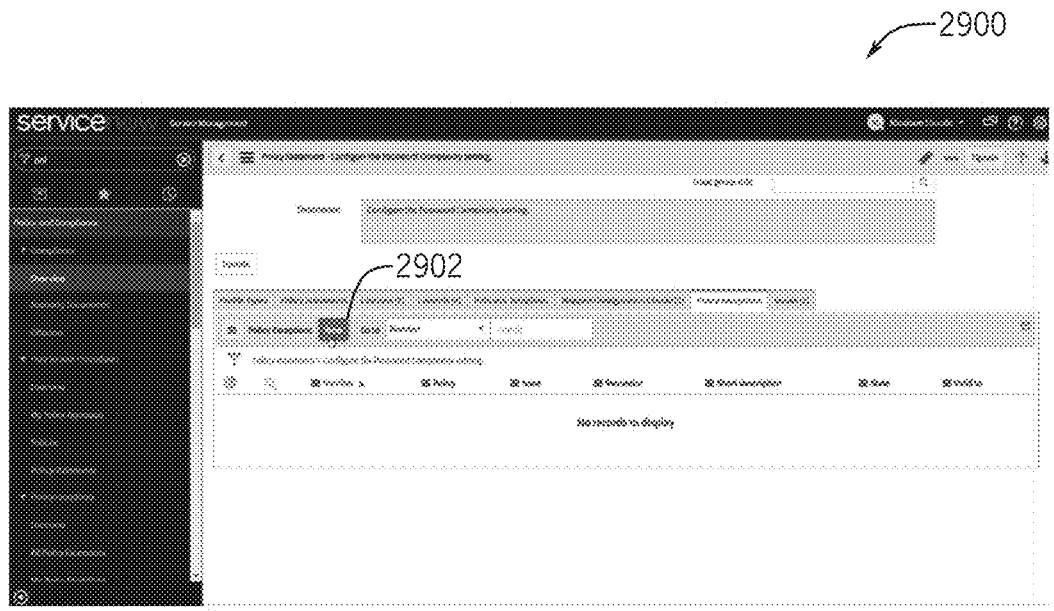
FIG. 29 is an illustration of the Policy Exceptions tab of the GUI of FIG. 23, illustrating implementation of a policy exception for the remaining non-compliant CI, in accordance with an embodiment.
Figure 30:
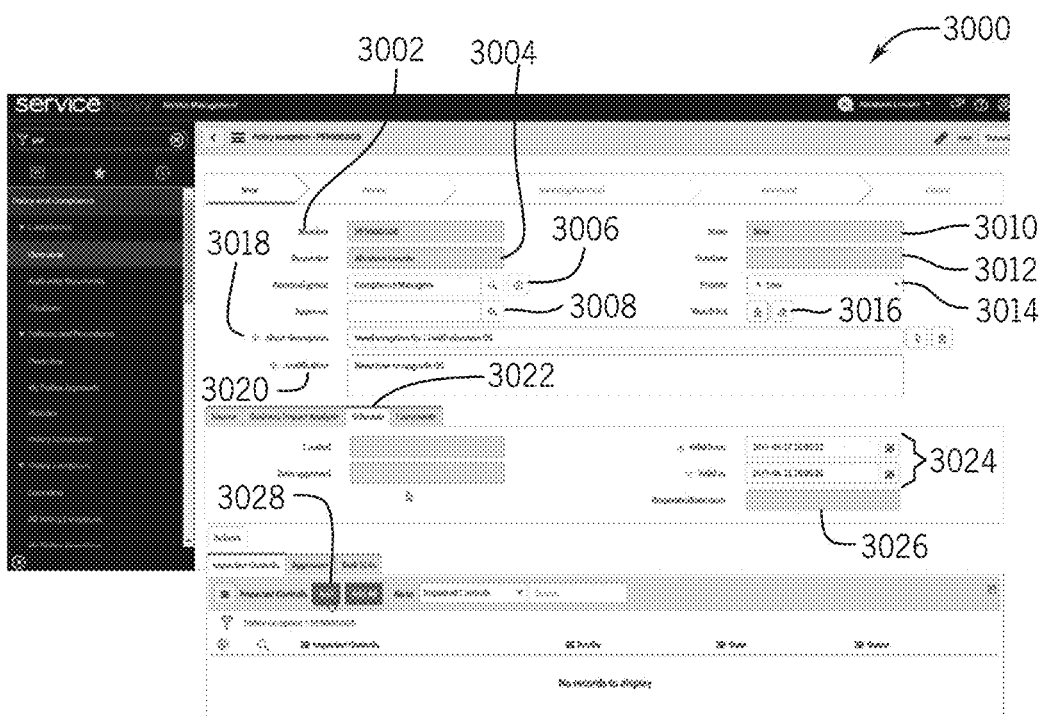
FIG. 30, is an illustration of a Policy Exception dialog box, in accordance with an embodiment.

FIG. 29 is an illustration of the Policy Exceptions tab 2900 of the GUI 2200 of FIG. 22, illustrating implementation of a policy exception for a policy statement (e.g., the policy statement for the remaining non-compliant CI 110 of our example), in accordance with an embodiment. Upon selection of the "New" option 2902, the Policy Exception dialog box 3000 may be presented, in accordance with an embodiment. The Policy Exception dialog box 3000 provides a unique identifier 3002 for the policy exception, the requestor 3004, the approval group 3006, the approver 3008, the state of the policy exception 3010, the substrate 3012, the priority 3014, a watchlist option 3016, a short description 3018, and a justification 3020. Following our example, the short description indicates that an exception for the non-compliant CI 110 is needed, because it has an obsolete OS (e.g., that does not support complex passwords). The justification 3020 indicates that this remediation effort will take some time and, thus, an exception duration is needed.

Figure 31:
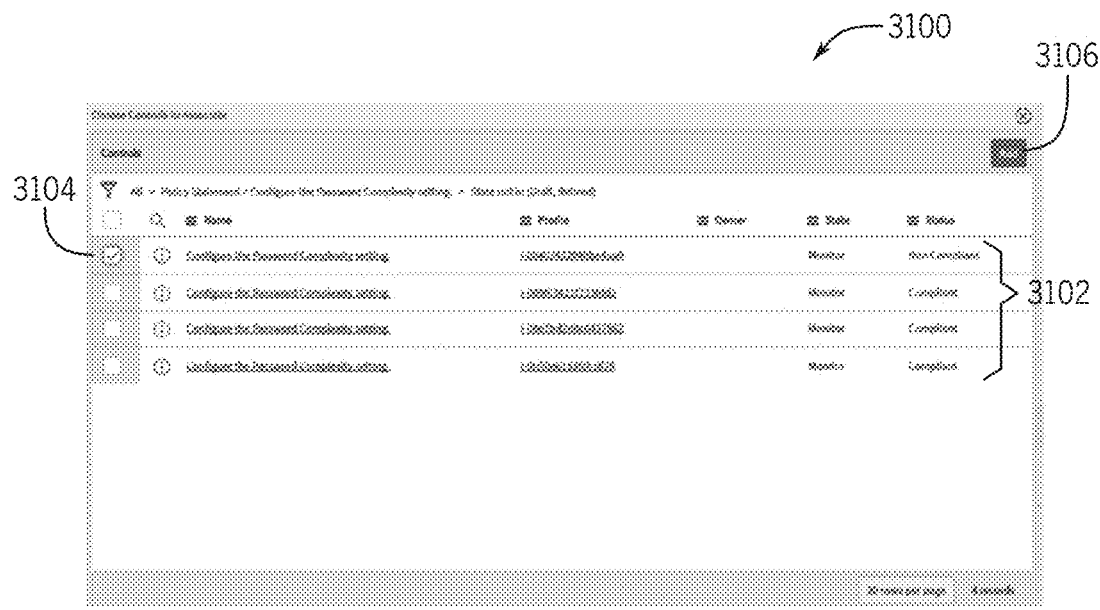
FIG. 31 is an illustration of a dialog box for associating controls with a created policy exception request, in accordance with an embodiment.

The schedule tab 3022 allows the user to request a particular duration 3024 and request extensions to the duration via field 3026. The user may add associated controls for the exception by selecting the "Add" icon 3028, resulting in presentation of the dialog box 3100 of FIG. 31, which enables association of controls with a created policy exception request, in accordance with an embodiment. As illustrated in the dialog box 3100, controls may be selected from the list 3102 that provides a list of controls associated with the previously selected policy statement. Here, the control 3104 associated with the non-compliant CI 110 is selected and added to the exception request (e.g., by selecting "Add" option 3106).

Figure 32:
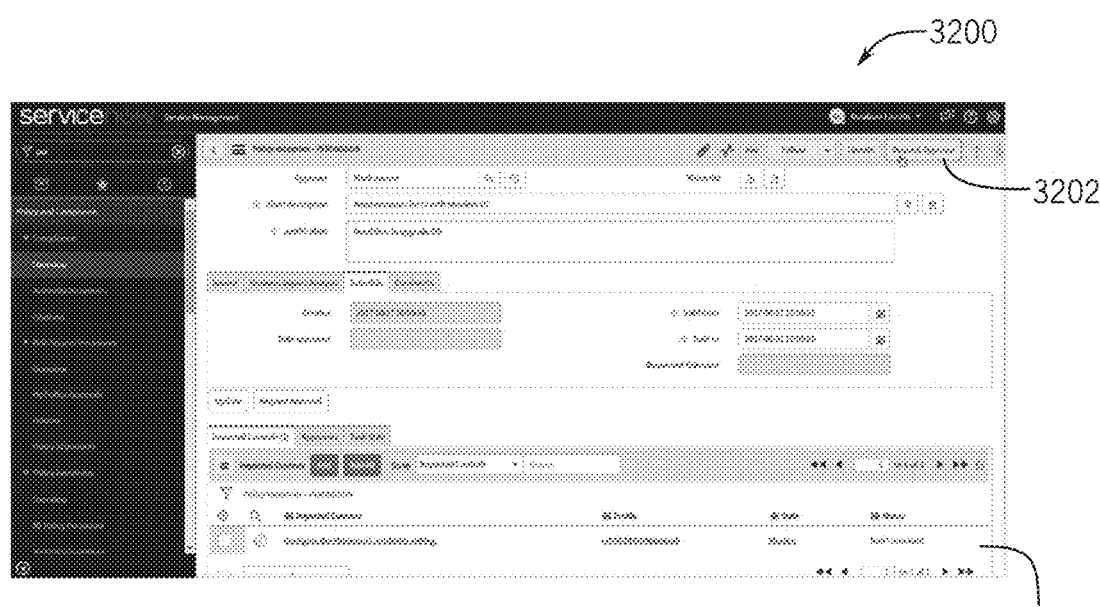
FIG. 32 is an illustration of triggering a policy exception request, in accordance with an embodiment.

From there, the updated GUI 3200 of FIG. 32 is presented, indicating that the selected control 3104 is associated with the policy exception. The policy exception request is sent to an approver by selecting the "Request Approval" option 3202.

Figure 33:
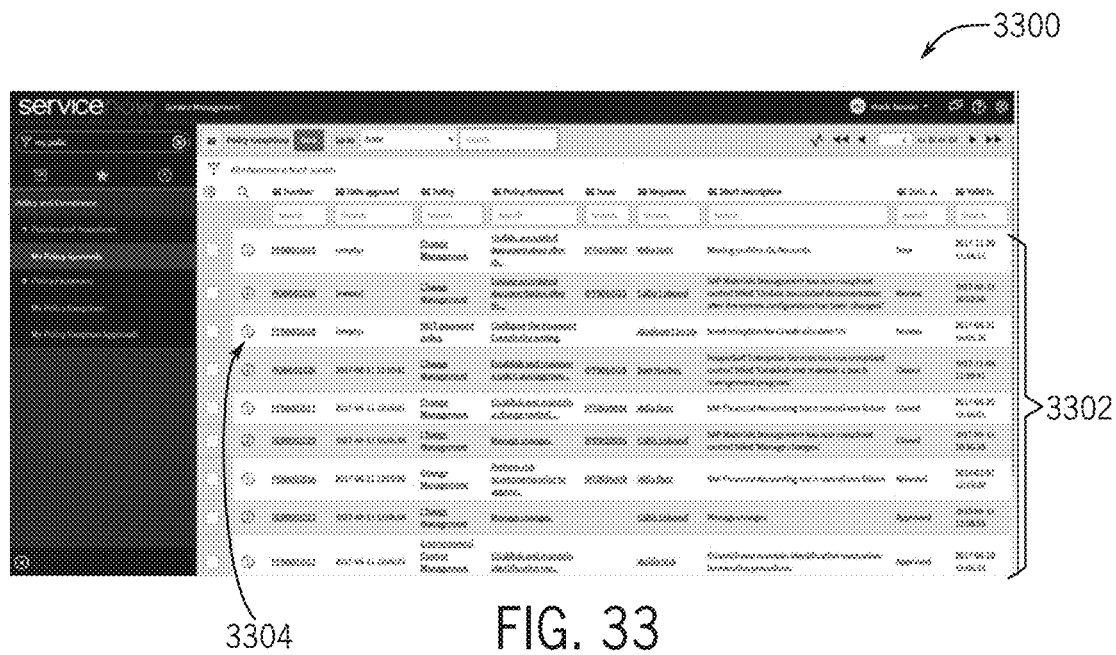
FIG. 33 is an illustration of a GUI for facilitating policy exception approval (e.g., by a compliance officer), in accordance with an embodiment.
Figure 34:
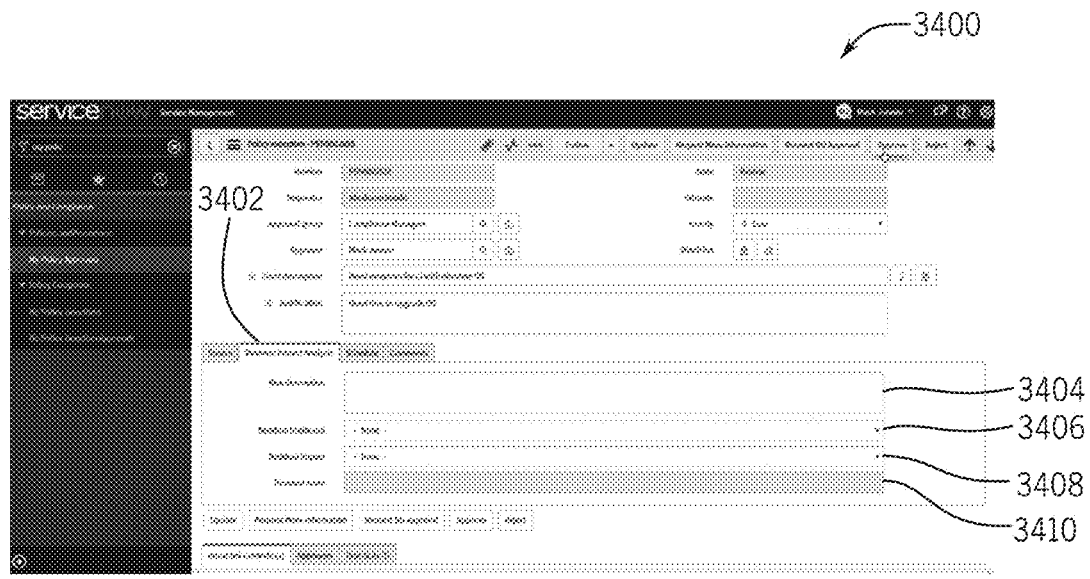
FIG. 34 is an illustration of a GUI that provides details of a requested policy exception, in accordance with an embodiment.

The policy exception request is received by an approver. FIG. 33 is an illustration of a GUI 3300 for facilitating policy exception approval (e.g., by a compliance officer), in accordance with an embodiment. The GUI 3300 provides a compiled list of policy exception requests 3302. As illustrated, the request 3304 submitted in FIG. 32 is presented in the list 3302. Upon selection of the request 3304. The request details GUI 3400 of FIG. 34 is presented. GUI 3400 provides details of the selected policy exception request 3304, in accordance with an embodiment. The Business Impact Analysis tab 3402 enables additional risk details pertaining to the non-compliance to be added to the exception request. For example, a risk description 3404, a residual likelihood 3406, a residual impact 3408, etc. may result in a residual score 3410.

The residual risk score 3410 may be used in the calculated risk score, as discussed above. However, as will be discussed in detail below, risk remains for non-compliant CIs 110, despite policy exemption. Thus, approved policy exceptions do not reduce the risk score.

Figure 35:
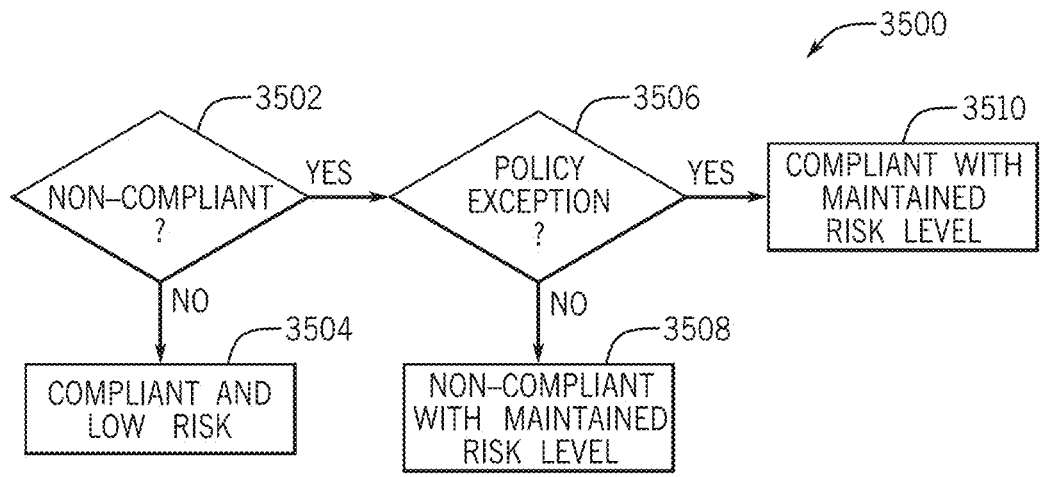
FIG. 35 is a flowchart, illustrating a process for defining compliance status and risk, in accordance with an embodiment.

FIG. 35 is a flowchart, illustrating a process 3500 for defining compliance status and risk, in accordance with an embodiment. The process 3500 begins by determining if the controls indicate non-compliance (decision block 3502). If the controls do not indicate non-compliance, the compliance status is compliant, resulting in a low risk, as the control non-compliance percentage 3509 used to weigh the risk will be 0% (block 3504).

When non-compliance is detected, an additional determination is made as to whether there is currently an approved policy exception for the non-compliant policy statement controls (decision block 3506). If there is no approved policy exception, the status remains non-compliant and the risk is maintained, as the control non-compliance percentage 3509 remains at 100% (block 3508).

When there is an approved policy exception, the status is changed to compliant (e.g., to silence the non-compliance for the approved duration). However, the risk is maintained, as the control non-compliance percentage 3509 remains at 100% (block 3510).

Figure 36:
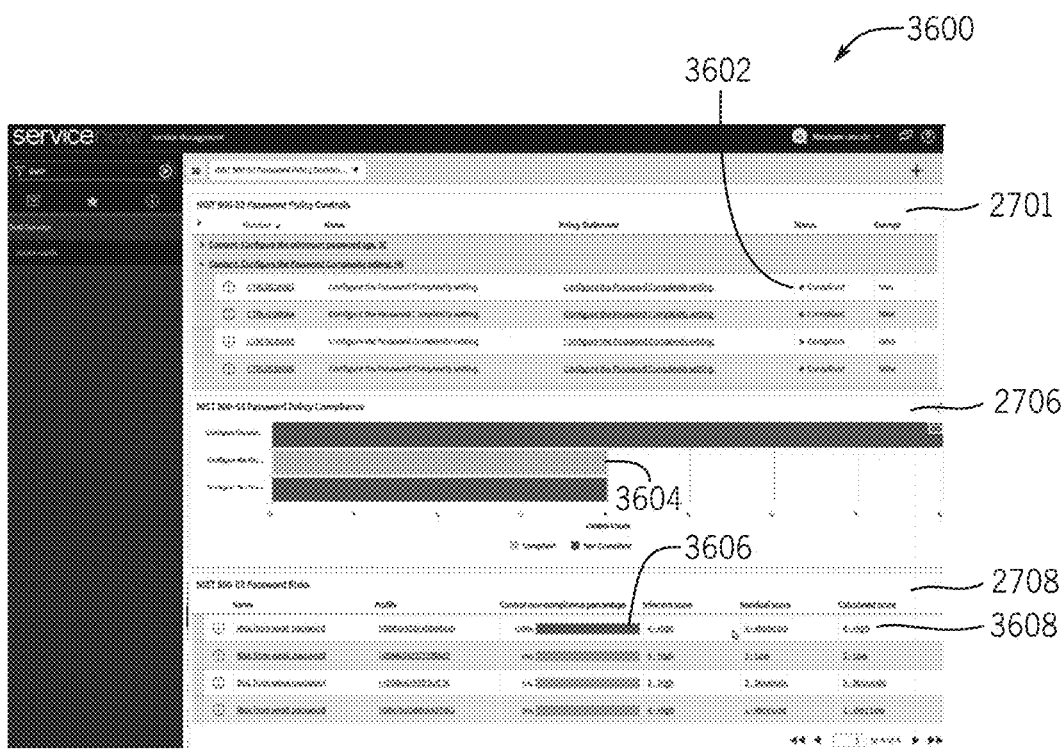
FIG. 36 is an illustration of updated widgets, based upon policy exception approval, in accordance with an embodiment.

FIG. 36 is an illustration of a GUI 3600 with updated widgets 2701, 2706, and 2708, based upon policy exception approval, in accordance with an embodiment. As illustrated in widget 2701, the status 3602 is set to compliant for the excepted policy statement. Further, the compliance is indicated in updated bar graph 3604. In widget 2708, despite the new compliance status for the policy statement, the control non-compliance percentage 3606 remains 100%, causing the calculated score 3608 to remain high.

As may be appreciated, by mapping SCA tools with GRC tools and underlying business service intelligence, a multitude of new and useful information may be presented to operations personnel and management. Further, enhanced compliance auditing tasks may be performed automatically for an entire system in near real time, which is unfeasible for human auditing capabilities. Using the techniques provided herein, system configuration vulnerabilities may be efficiently remediated resulting in strengthened networked environments.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising machine-readable instructions, that when executed by one or more processors, cause the one or more processors to:
retrieve, from one or more application programming interfaces (APIs), configuration test results for one or more sets of configuration tests evaluated against one or more configuration items (CIs), wherein each of the one or more sets of configuration tests corresponds to one or more authoritative policies;
normalize the configuration test results such that configuration test result data from different sources is stored in a common computer-readable format in the machine-readable medium;
determine compliance data for the one or more CIs with the one or more authoritative policies based on the configuration test results;
identify a set of CIs of interest based upon the compliance data, wherein each CI in the set of CIs of interest is in non-compliance with at least one of the one or more authoritative policies;
determine a respective residual risk score for a particular CI in the set of CIs of interest by:
identifying, by accessing data from a data store, an indication of a plurality of services associated with the particular CI;
identifying a highest criticality of the plurality of services; and
setting the respective residual risk score for the particular CI based upon the highest criticality; and
present, in a configuration compliance dashboard rendered on an electronic display, a residual score indication based upon the respective residual risk score associated with each CI of the set of CIs of interest.

2. The machine-readable medium of claim 1, comprising machine-readable instructions, that when executed by the one or more processors, cause the one or more processors to:
calculate an overall risk score for non-compliance by the one or more sets of configuration tests to a policy statement of the one or more authoritative policies based at least in part upon the respective residual risk score for one or more CIs of the set of CIs of interest.

3. The machine-readable medium of claim 2, comprising machine-readable instructions, that when executed by the one or more processors, cause the one or more processors to:
calculate the overall risk score based at least in part upon the respective residual risk score for one or more CIs of the set of CIs of interest and an inherent score for at least one of the one or more sets of configuration tests, the inherent score comprising a score associated with non-compliance to the at least one of the one or more sets of configuration tests, as indicated by the configuration test results.

4. The machine-readable medium of claim 3, comprising machine-readable instructions, that when executed by the one or more processors, cause the one or more processors to:
for each CI of the set of CIs of interest, calculate the overall risk score by combining the respective residual risk score and the inherent score.

5. The machine-readable medium of claim 2, comprising machine-readable instructions, that when executed by the one or more processors, cause the one or more processors to:
calculate the overall risk score by:
identifying a percentage of non-compliance to the policy statement;
maximizing the respective residual risk score and an inherent score for the one or more sets of configuration tests into a maximized score; and
weighing the maximized score by the percentage of non-compliance to the policy statement.

6. The machine-readable medium of claim 2, comprising machine-readable instructions, that when executed by the one or more processors, cause the one or more processors to:
calculate the overall risk score, by:
retrieving an active risk score calculator from a set of available risk score calculators, each of the set of available risk score calculators comprising a respective machine-readable script instructing the one or more processors how to calculate the overall risk score; and
executing the respective machine-readable script of the active risk score calculator to calculate the overall risk score.

7. The machine-readable medium of claim 1, comprising machine-readable instructions, that when executed by the one or more processors, cause the one or more processors to:
enable grouping, via a graphical user interface, of a subset of the configuration test results.

8. The machine-readable medium of claim 1, comprising machine-readable instructions, that when executed by the one or more processors, cause the one or more processors to:
enable deferral of one or more of the configuration test results, via a configuration test result group, for a duration of time, such that the one or more of the configuration test results is not indicated as non-compliant in a subsequent rendering of the configuration compliance dashboard.

9. The machine-readable medium of claim 1, comprising machine-readable instructions, that when executed by the one or more processors, cause the one or more processors to:
retrieve the one or more authoritative polices, via the one or more APIs; and
map the one or more authoritative policies to relevant subsets of the one or more sets of configuration tests.

10. A computer-implemented method, comprising:
retrieving, from one or more application programming interfaces (APIs), configuration test results for a set of configuration tests evaluated against one or more configuration items (CIs), wherein each configuration test in the set of configuration tests is associated with one or more authoritative policies;
normalizing the configuration test results such that configuration test result data from different sources is stored in a common computer-readable format in a machine-readable medium;
determining compliance data for the one or more CIs with the one or more authorative policies based on the configuration test results;
identifying a set of CIs of interest based upon the compliance data, wherein each CI in the set of CIs of interest is in non-compliance with at least one of the one or more authoritative policies;
determining a respective residual risk score for a particular CI in the set of CIs of interest, by:
identifying, by accessing data from a data store, an indication of a plurality of services associated with the particular CI;
identifying a highest criticality of the plurality of services; and
setting the respective residual risk score for the particular CI based upon the highest criticality; and
presenting, in a configuration compliance dashboard rendered on an electronic display, a residual score indication based upon the respective residual risk score associated with each CI of the set of CIs of interest.

11. The computer-implemented method of claim 10, comprising:
calculating an overall risk score for non-compliance by the set of configuration tests to a policy statement of the one or more authoritative policies based at least in part upon the respective residual risk score for one or more CIs of the set of CIs of interest.

12. The computer-implemented method of claim 11, comprising:
calculating the overall risk score based at least in part upon the respective residual risk score for each of the CIs in the set of CIs of interest and an inherent score for the set of configuration tests, the inherent score comprising a score associated with non-compliance to the set of configuration tests, as indicated by the configuration test results.

13. The computer-implemented method of claim 12, comprising:
calculating the overall risk score by combining the respective residual risk score for each of the CIs of the set of CIs of interest and the inherent score.

14. The computer-implemented method of claim 11, comprising:
calculating the overall risk score by:
identifying a percentage of non-compliance to the policy statement;
maximizing the respective residual risk score for each of the CIs in the set of CIs of interest and an inherent score for the set of configuration tests into a maximized score; and
weighing the maximized score by a percentage of non-compliance to the policy statement.

15. The computer-implemented method of claim 11, comprising:
calculating the overall risk score, by:
retrieving an active risk score calculator from a set of available risk score calculators, each of the set of available risk score calculators comprising a respective machine-readable script instructing how to calculate the overall risk score; and
executing the respective machine-readable script of the active risk score calculator to calculate the overall risk score.

16. The computer-implemented method of claim 10, comprising:
enabling grouping, via a graphical user interface, of a subset of the configuration test results.

17. The computer-implemented method of claim 10, comprising:
enabling deferral of one or more of the configuration test results, via a configuration test result group, for a duration of time, such that the one or more of the configuration test results is not indicated as non-compliant in a subsequent rendering of the configuration compliance dashboard.

18. The computer-implemented method of claim 10, comprising:
retrieving the one or more authoritative policies, via the one or more APIs; and
mapping the one or more authoritative policies to relevant subsets of the set of configuration tests.

19. A cloud-computing system, comprising:
a network, comprising a plurality of configuration items (CIs);
a platform configured to present information regarding the plurality of CIs;
a management, instrumentation, and discovery (MID) server, configured to facilitate data transfer between the plurality of CIs and platform, the data enabling presentation of information regarding the plurality of CIs via the platform;
wherein the platform is configured to:
retrieve configuration test results for a set of configuration tests evaluated against the plurality of CIs, wherein each configuration test in the set of configuration tests is associated with one or more authoritative policies;
normalize the configuration test results such that configuration test result data from different sources is stored in a common computer-readable format in a machine-readable medium;
determine compliance data for the plurality of CIs with the one or more authoritative policies based on the configuration test results;
identify a set of CIs of interest based upon the compliance data, wherein each CI in the set of CIs of interest is in non-compliance with at least one of the one or more authoritative policies;
determine a respective residual risk score for a particular CI in the set of CIs of interest:
identifying, by accessing data from a data store, an indication of a plurality of services associated with the particular CI;

identifying a highest criticality of the plurality of services; and setting the respective residual risk score for the particular CI based upon the highest criticality; and present, in a configuration compliance dashboard rendered on an electronic display, a residual score indication based upon the respective residual risk score associated with each CI of the set of CIs of interest.

20. The cloud-computing system of claim 19, wherein the platform is configured to:

calculate an overall risk score by:

combining the respective residual risk score for at least one CI in the set of CIs of interest and an inherent score, the inherent score comprising a score associated with non-compliance to the set of configuration tests, as indicated by the configuration test results; or identifying a percentage of non-compliance to a policy statement associated with the one or more authoritative policies;

maximizing the respective residual risk score for the at least one CI in the set of CIs of interest and the inherent score for the set of configuration tests into a maximized score; and weighing the maximized score by the percentage of non-compliance to the policy statement.

* * * * *